June 19, 1962 R. KOBLER ET AL 3,040,133

TELEPHONE CALLING EQUIPMENT

Filed Dec. 31, 1958 12 Sheets-Sheet 1

INVENTORS
RICHARD KOBLER
WILLIAM G. WHITNEY
BY
George H. Fritzinger
AGENT

TELEPHONE CALLING EQUIPMENT

Filed Dec. 31, 1958

INVENTORS
RICHARD KOBLER
WILLIAM G. WHITNEY
BY
George H. Fritzinger
AGENT

TELEPHONE CALLING EQUIPMENT

Filed Dec. 31, 1958

INVENTORS
RICHARD KOBLER
WILLIAM G. WHITNEY
BY
George H. Fritzinger
AGENT

June 19, 1962 R. KOBLER ET AL 3,040,133

TELEPHONE CALLING EQUIPMENT

Filed Dec. 31, 1958 12 Sheets-Sheet 4

INVENTORS
RICHARD KOBLER
WILLIAM G. WHITNEY
BY
George H. Fritzinger
AGENT

INVENTORS
RICHARD KOBLER
WILLIAM G. WHITNEY
BY
George H. Fritzinger
AGENT

INVENTORS
RICHARD KOBLER
WILLIAM G. WHITNEY
BY George H. Fritzinger
AGENT

June 19, 1962 R. KOBLER ET AL 3,040,133

TELEPHONE CALLING EQUIPMENT

Filed Dec. 31, 1958 12 Sheets-Sheet 7

INVENTORS
RICHARD KOBLER
WILLIAM G. WHITNEY
BY
George H. Fritzinger
AGENT

TELEPHONE CALLING EQUIPMENT

INVENTORS
RICHARD KOBLER
WILLIAM G. WHITNEY
BY
George H. Fritzinger
AGENT

TELEPHONE CALLING EQUIPMENT

Filed Dec. 31, 1958 12 Sheets-Sheet 9

INVENTORS
RICHARD KOBLER
WILLIAM G. WHITNEY
BY
George H. Fritzinger
AGENT

June 19, 1962 R. KOBLER ET AL 3,040,133

TELEPHONE CALLING EQUIPMENT

Filed Dec. 31, 1958 12 Sheets-Sheet 10

INVENTORS
RICHARD KOBLER
WILLIAM G. WHITNEY

BY

George H. Fritzinger
AGENT

INVENTORS
RICHARD KOBLER
WILLIAM G. WHITNEY
BY George H. Fritzinger
AGENT

June 19, 1962 R. KOBLER ETAL 3,040,133

TELEPHONE CALLING EQUIPMENT

Filed Dec. 31, 1958 12 Sheets-Sheet 12

INVENTORS
RICHARD KOBLER
WILLIAM G. WHITNEY
BY George H. Fritzinger
AGENT

United States Patent Office 3,040,133
Patented June 19, 1962

3,040,133
TELEPHONE CALLING EQUIPMENT

Richard Kobler, West Orange, and William G. Whitney, Pines Lake, N.J., assignors to McGraw-Edison Company, Elgin, Ill., a corporation of Delaware Filed Dec. 31, 1958, Ser. No. 784,258
19 Claims. (Cl. 179—90)

This invention relates to equipment which is electrically connectable to a subscriber's telephone set for automatically calling selected telephone numbers, and particularly it relates to such equipment having a recording-reproducing apparatus which is operable selectively for recording telephone numbers in code form and for reproducing the coded telephone numbers and recreating in the telephone line the same signal pulses as when a subscriber's telephone number is dialed directly.

As is well known, the letters and digits of subscribers' telephone numbers are represented by trains of current pulses, effected by repeated break-make operation of a pulsing switch in the telephone circuit, as the respective letters and digits are dialed. For example, upon dialing the number 1 a single pulse is created, on dialing the number 2 or the letters ABC two pulses are created, on dialing the number 3 or the letters DEF three pulses are created, etc. These pulses are transmitted over voice frequency telephone lines to control automatic switching equipment for connecting the calling subscriber's line to the called subscriber's telephone.

It is advantageous whenever a subscriber has need to make frequent calls from a list of telephone numbers that he be able to do so by a simple selective manipulation without having to read each telephone number and then transfer that number to an operator or dial the number directly with chance of making error and getting the wrong party. However, in order that such automatic calling equipment may be practical it must not only have facility for storing a large list of coded telephone numbers but it must also be adapted to enable the numbers of such list to be readily changed and to enable numbers to be added as well as to be removed readily from the list.

The present invention resides in improvements in the telephone calling equipment described and claimed in the pending application Serial Number 657,378 of Richard Kobler, filed May 6, 1957.

This prior telephone calling equipment operates to record each individual dialing pulse produced by the dialing mechanism when letters and digits of telephone numbers are dialed. During playback, it is called upon to reproduce individual pulses without distortion either as to their periodicity, form or duration. By recording respective series of pulses according to the digit or letter dialed, there can arise an accumulation of errors which modify the character, duration and periodicity of the individual pulses. For instance, there are errors arising from mechanical tolerance limitations on the dialing mechanism itself, errors in recording the individual pulses and errors in reproducing the pulses when calls are to be made. The limitations by telephone companies on the length, uniformity and periodicity of the pulses representing each digit or letter of a telephone number are very rigid—so rigid that little or no tolerance margins are left over and above the minimum practical tolerances within the standard dialing mechanism itself. Therefore, the recording and reproducing operations by this prior method are required to be essentially error free.

By way of more specific description of the above difficulties of the prior system, it is to be noted that telephone dialing mechanisms suffer from considerable speed variations as between each other and undergo considerable speed variations during their lifetime. This causes variations in the periodicity of the dialing pulses and in the relative break-make-periods characterizing each pulse. There are also difficulties in recording and reproducing recurrent series of shoft pulses representing the individual digits and letters. Not only are transients encountered which modify the pulses, but variations occur in record speed during recording and reproducing, and electro-mechanical relays undergo variations in responding to the individual pulses, which further change the periodicity and relative break-make-periods of the pulses fed into the telephone line when a number is called. Telephone companies prescribed that the periodicity of the pulses shall be at 100 millisecond intervals and that the duration of each pulse shall be 60 milliseconds, each within a variation of only a few milliseconds. This requires precision dialing equipment and leaves no margin for other tolerances from recorder-reproducer speed variations, integration delays in amplifiers, variations in pull-in and drop-out of relays, etc.

The present invention resides particularly in recording continuous signal bands of time durations in predetermined proportion to the digits or letters dialed, instead of recording respective series of short pulses representing the individual digits and letters; and in recreating successive series of pulses according to the duration of the respective signal bands—otherwise herein referred to as "time bands"—when those bands are reproduced. When it is considered that telephone numbers comprise seven digits on the average, and that the respective digits comprise five pulses on the average, any recording equipment based on the recording of the individual pulses is activated about 35 times on the average both during the recording and during the reproducing of each telephone number. In the present system wherein continuous signal bands are recorded instead of individual pulses and wherein activation of the equipment is synchronized with the beginning and ending of the digits rather than with a multitude of pulses for each digit, the strain on the equipment is reduced by the order of five times. This results in a corresponding reduction in source of error.

The present invention further provides a marked increase in the precision with which successive time bands are recorded as successive digits are dialed, and with which such time bands when reproduced are converted into dialing pulses. This is accomplished by using a dial which when released from an operate position is maintained during its return to home position at a precise speed controlled by a synchronous motor. Still more importantly, during playback, the motor takes over the function of translating the recorded time bands into pulses of precise periodicity and duration. For example, the instant the playback of a time band begins a one-revolution integrating clutch is activated to couple a cam to the motor shaft, and the instant the playback of the time band ends a stop is introduced to deactivate the clutch and limit rotation of the cam to a precise number of whole revolutions dependent on the length of the time band. Such cam is of the type used in telephone dialing mechanisms and is driven at a precise speed by the motor while the clutch is activated to operate a dialing switch and produce one or more dialing pulses for each time band reproduced, depending on the length of the time band. The dialing pulses produced in this manner are uniform and have a precise duration and periodicity.

An important feature of the present invention is that when digits of telephone numbers are recorded in terms of continuous time bands and are converted during playback into dialing pulses, the lengths of the time bands can vary considerably without altering the number of dialing pulses sent out per digit dialed; moreover, such variations have no effect on the periodicity or character of the dialing pulses. In the prior system wherein the pulses of individual digits are recorded and reproduced, the response to each 60 millisecond pulse must be correct within about 5 milliseconds. In contrast, in the present system the response to each continuous time band representing a full digit need be correct to within only 30 milliseconds. The present system therefore not only reduces by many times the number of individual time elements which have to be recorded on and reproduced from the record to call telephone subscribers, but it is moreover much less critical as to the lengths of the individual time elements recorded on and reproduced from the record.

An object of the present invention is accordingly to provide a new system of recording and reproducing coded telephone numbers which operates with a markedly greater accuracy than has been heretofore possible.

Further it is an object to provide such system which reproduces the telephone numbers in terms of dialing pulses, and which is adapted to provide dialing pulses which are uniform and which have a precise periodicity and a precise ratio of break to make time.

It is another object to provide a new and improved method of recording and reproducing telephone numbers which operates to record continuous time bands on the record in predetermined relation to the respective letters or digits dialed, and during playback to convert such continuous time bands into whole numbers of dialing pulses having a precise periodicity.

Another object is to achieve improved accuracy in dialing telephone numbers by placing the dial during its return to home position under control of a fixed-speed motor.

Another object is to provide improved means for accurately converting recorded time bands into dialing pulses as the time bands are reproduced. A further object in this respect is to provide a motor driven cam for operating a dialing switch through a one-revolution integrating clutch controlled so as to be activated the instant playback of a recorded time band begins and to be de-activated to stop the switch always at a precise point when the playback of the time band ends.

Another object is to provide new and improved mechanisms and circuit systems for carrying out the aforestated objectives in a simple and economical manner.

Another object is to provide new and improved mechanisms and circuit systems for the purposes herein set forth which permit greater mechanical tolerances than were heretofore feasible and which are foolproof, durable and reliable in operation.

In the description of the invention reference is had to the accompanying drawings, of which:

Figure 1:
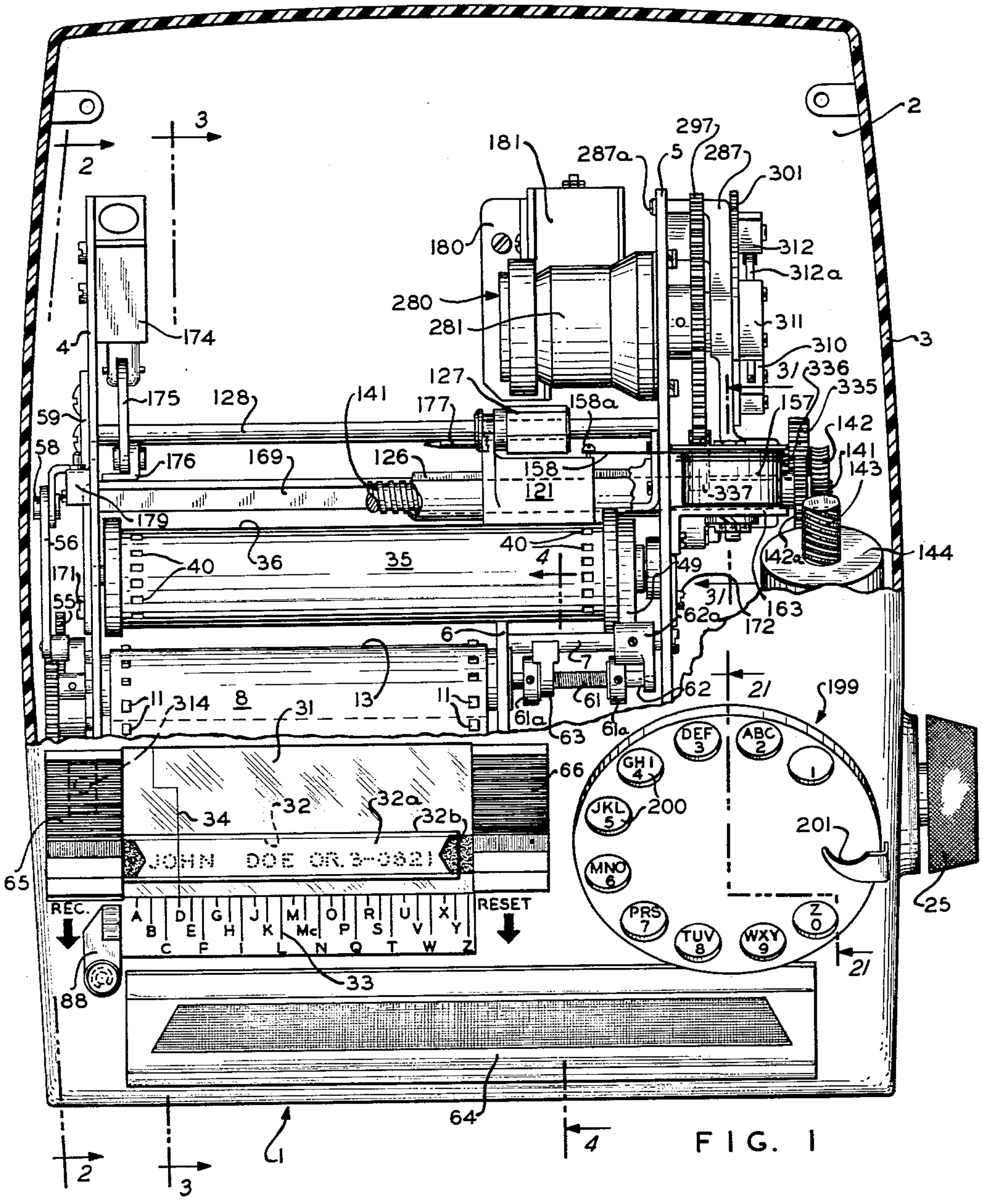
FIGURE 1 is a fractional plan view of a telephone calling machine according to the invention, wherein a top portion of the cover is broken away to show better a portion of the internal mechanism.
Figures 2, 3:
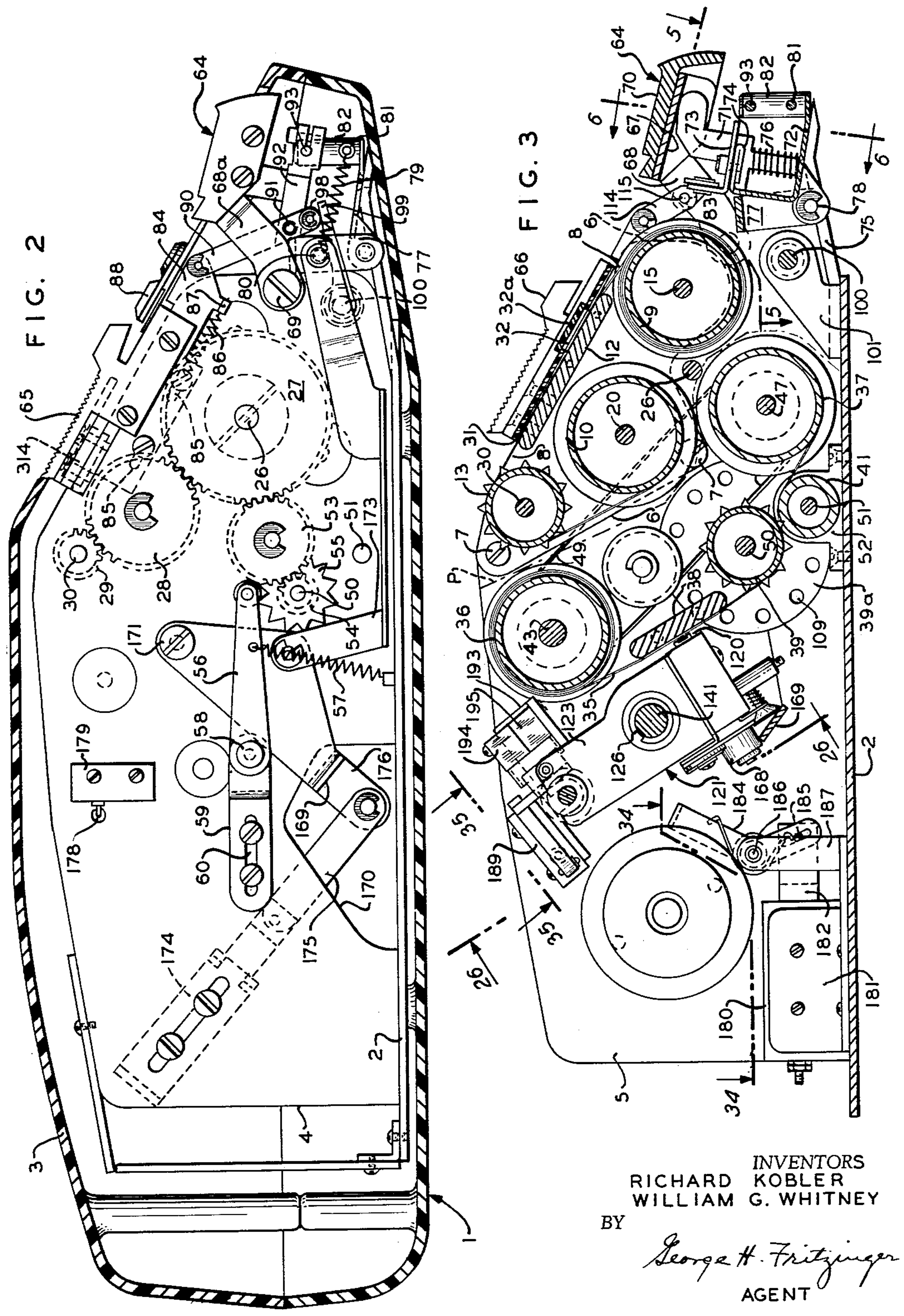
FIGURE 2 is a left-hand elevational view of the machine taken substantially on the line 2—2 of FIGURE 1.
FIGURE 3 is a fractional vertical sectional view through the machine taken substantially on the line 3—3 of FIGURE 1.
Figures 4, 5, 6:
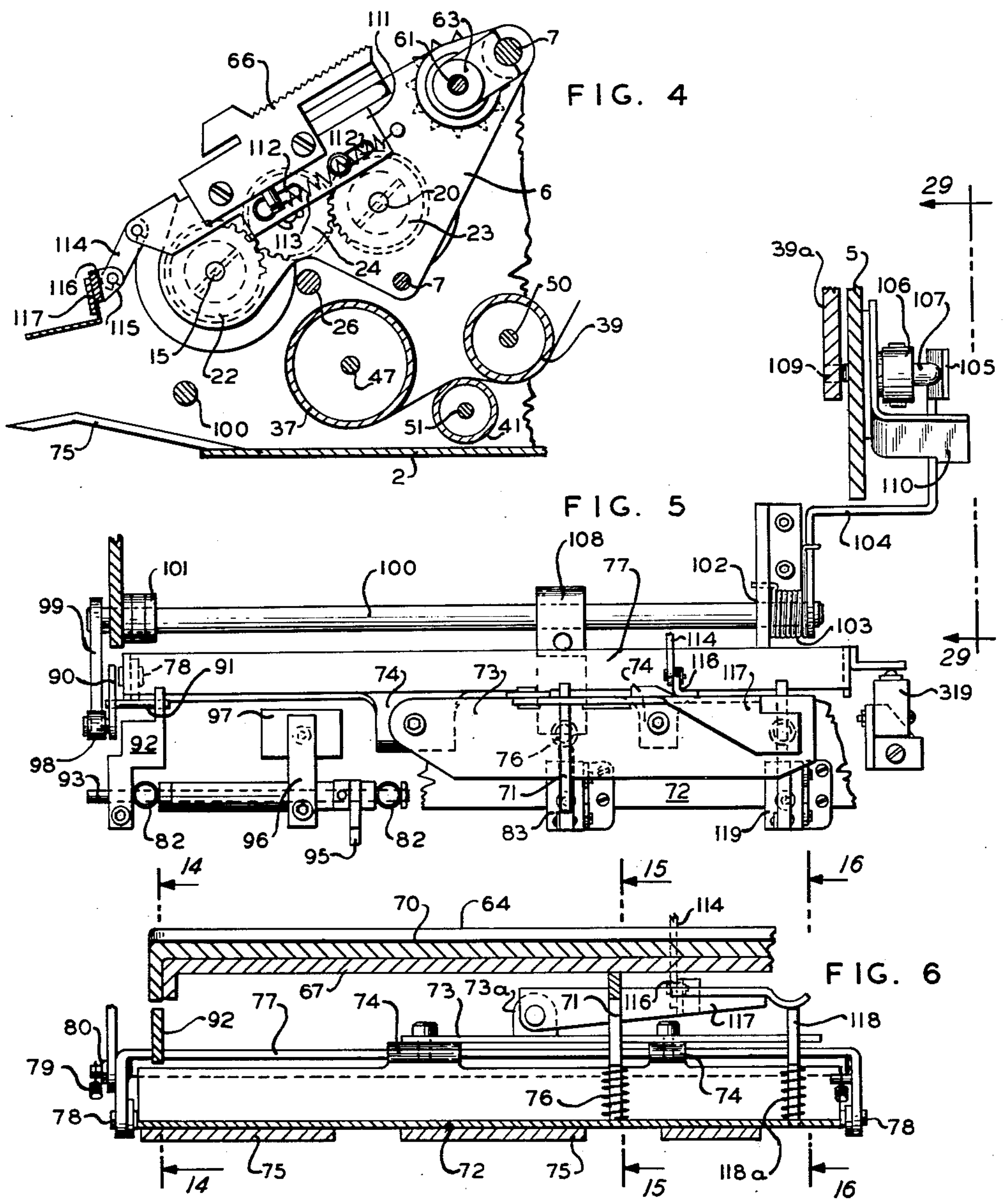
FIGURE 4 is a right-hand view of the supporting rolls for the tape media on which the subscribers' names are written and the subscribers' telephone numbers are recorded, taken substantially on the line 4—4 of FIGURE 1.
FIGURE 5 is a fractional horizontal sectional view taken on the line 5—5 of FIGURE 3.
FIGURE 6 is a vertical sectional view of a portion of the machine taken substantially on the line 6—6 of FIGURE 3.
Figures 14, 15, 16, 17:
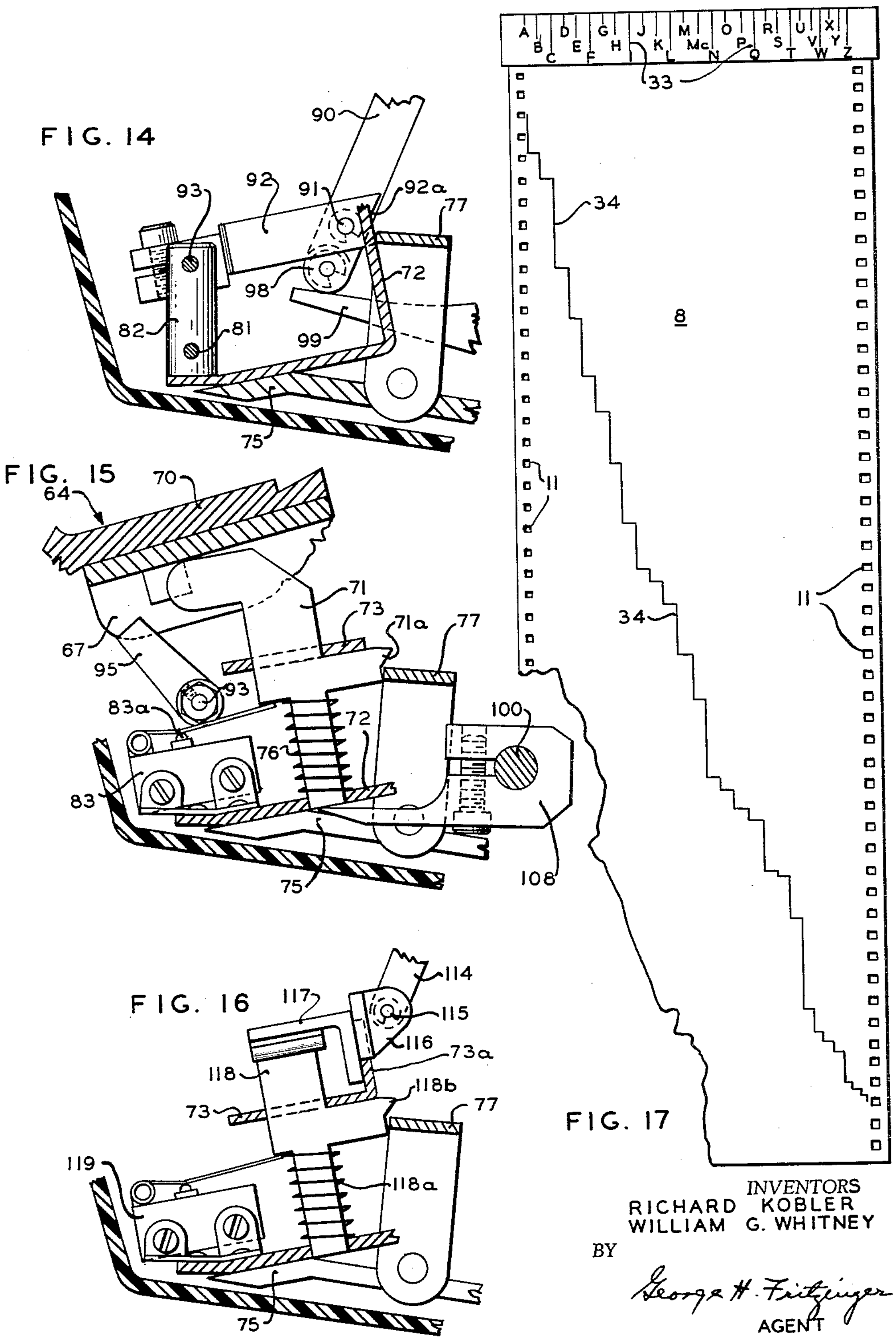
Figures 18, 19:
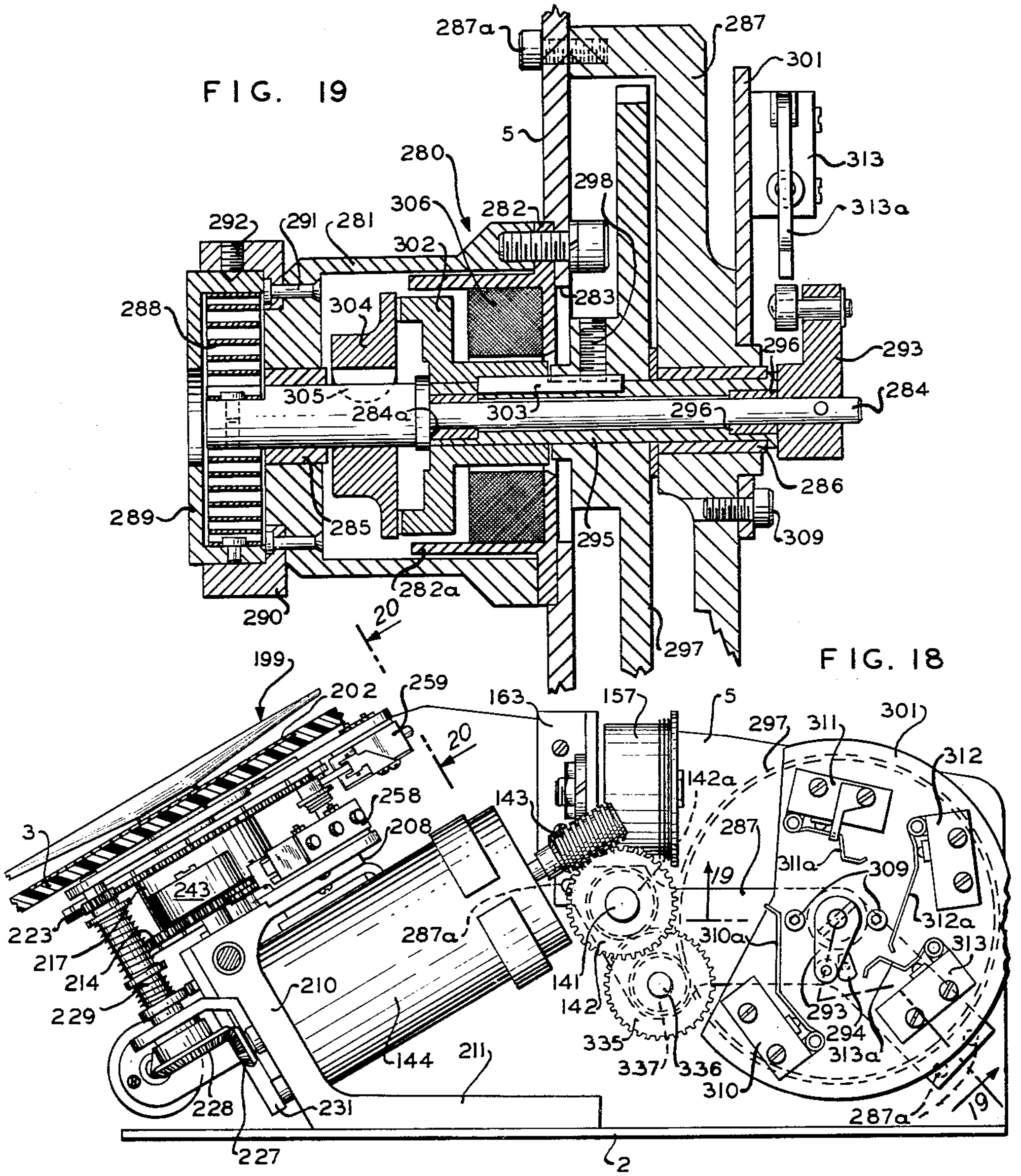
Figure 20:
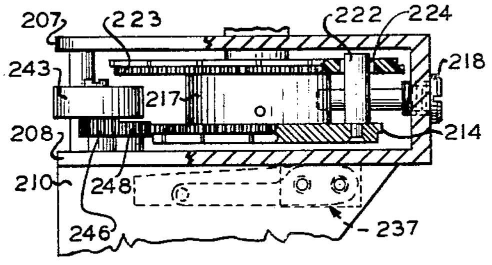
Figure 21:
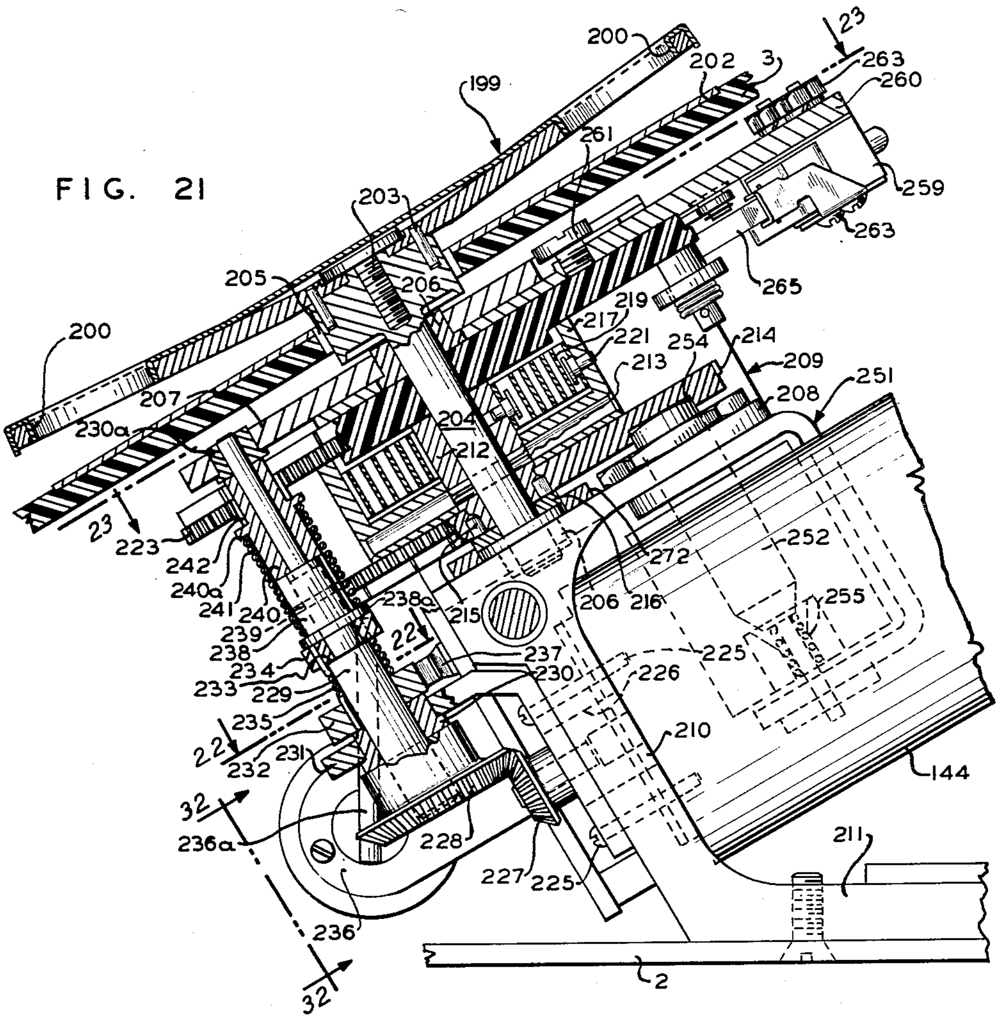
Figure 22:
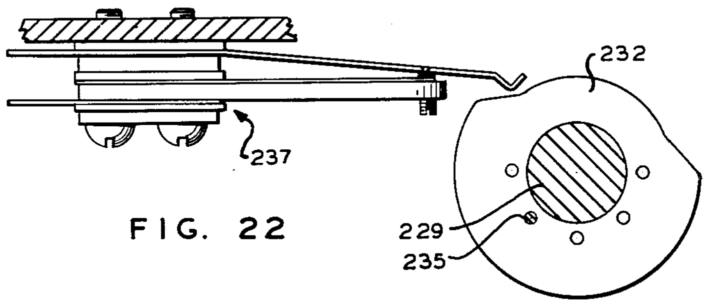
Figure 23:
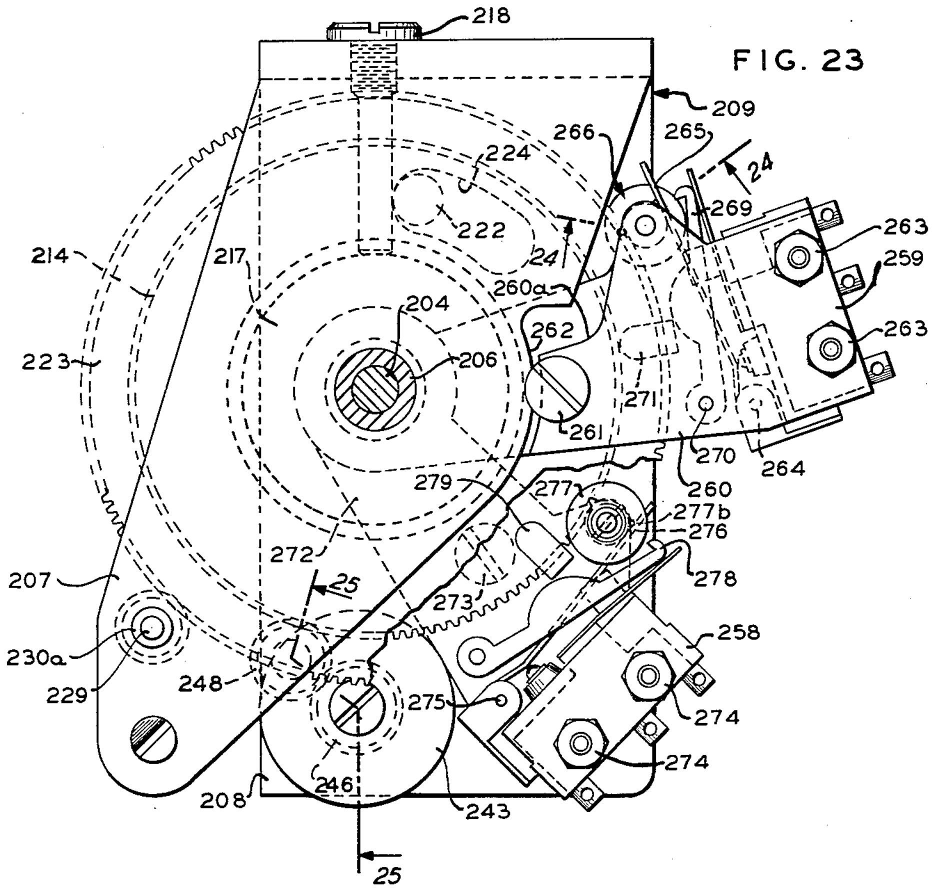
Figure 24:
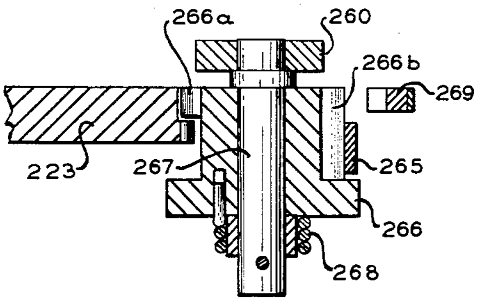
Figure 25:
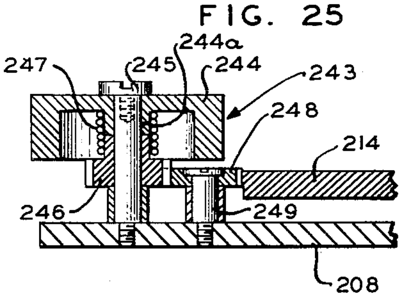
Figures 26, 27, 28, 29, 30:
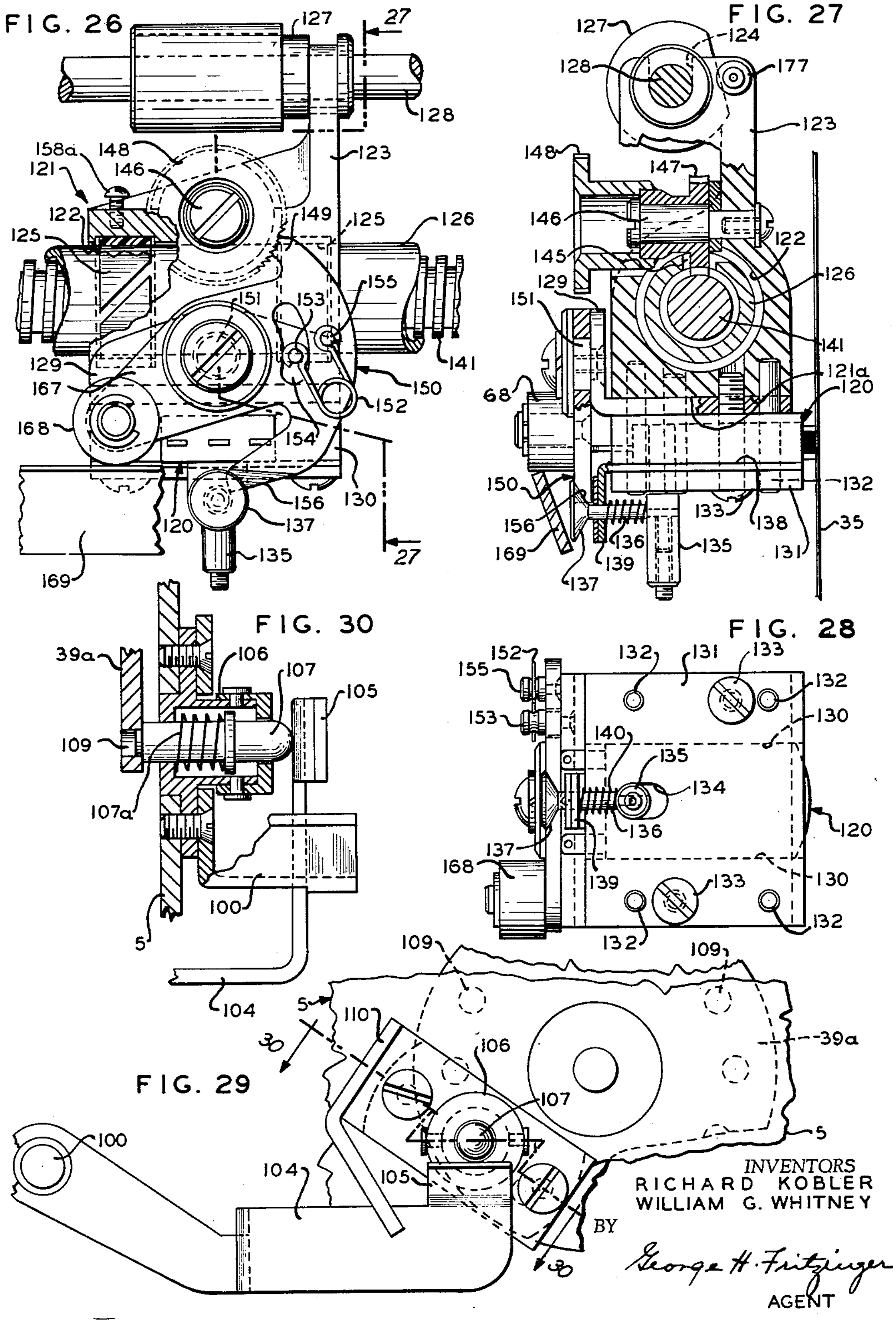

FIGURES 14, 15 and 16 are respective vertical sections to enlarged scale taken on the lines 14—14, 15—15 and 16—16 of FIGURE 6;

FIGURE 17 is a view of the subscriber's writing-tape unrolled to show the stepped indicator line thereon lengthwise thereof in relation to an alphabet scale crosswise of the tape;

FIGURE 18 is a partial right-hand view of the mechanism of the machine shown in FIGURE 1 as seen with the housing broken away;

FIGURE 19 is an axial section to enlarged scale taken through the advance clutch substantially on the line 19—19 of FIGURE 18;

FIGURE 20 is a fractional section on the line 20—20 of FIGURE 18;

FIGURE 21 is a right-hand view to enlarged scale of the dial mechanism shown in FIGURE 1, with parts in section substantially on the line 21—21 of that figure;

FIGURE 22 is a sectional view of portion of the mechanism shown in FIGURE 21 as seen from the line 22—22 of that figure;

FIGURE 23 is a plan view of the dialing mechanism with parts in section taken on the line 23—23 of FIGURE 21;

FIGURE 24 is a sectional view taken substantially on the line 24—24 of FIGURE 23;

FIGURE 25 is a section taken substantially on the line 25—25 of FIGURE 23;

FIGURE 26 is a rear view of the head carriage as seen from the line 26—26 of FIGURE 3;

FIGURE 27 is a section taken on the line 27—27 of FIGURE 26.

Figure 31:
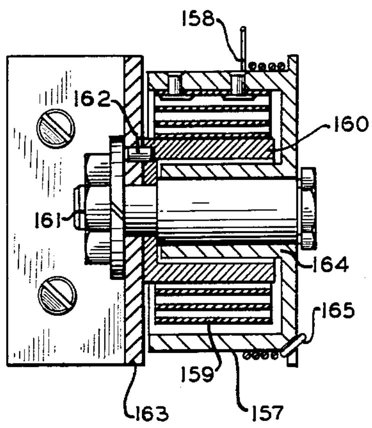
Figure 32:
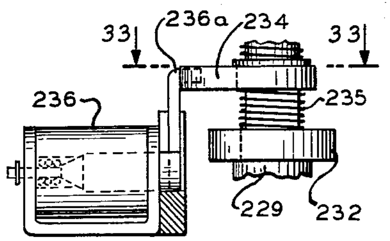
Figure 33:
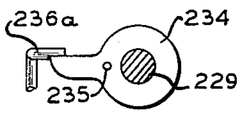
Figure 34:
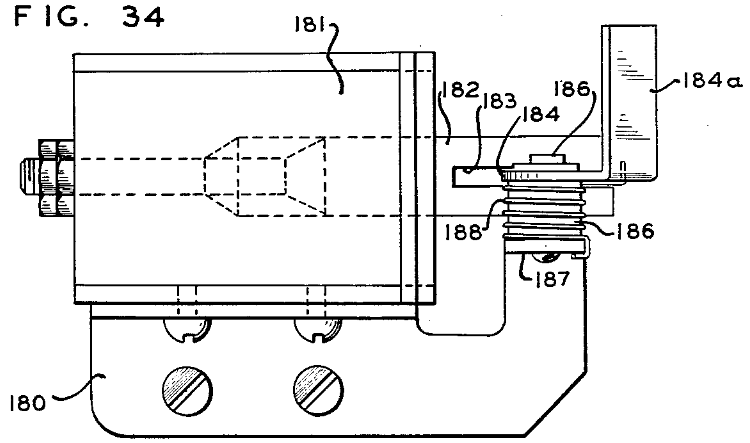
Figure 35:
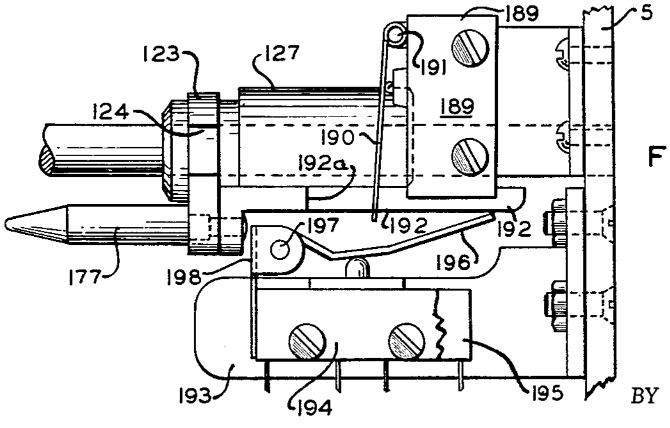
Figures 36, 37, 38:
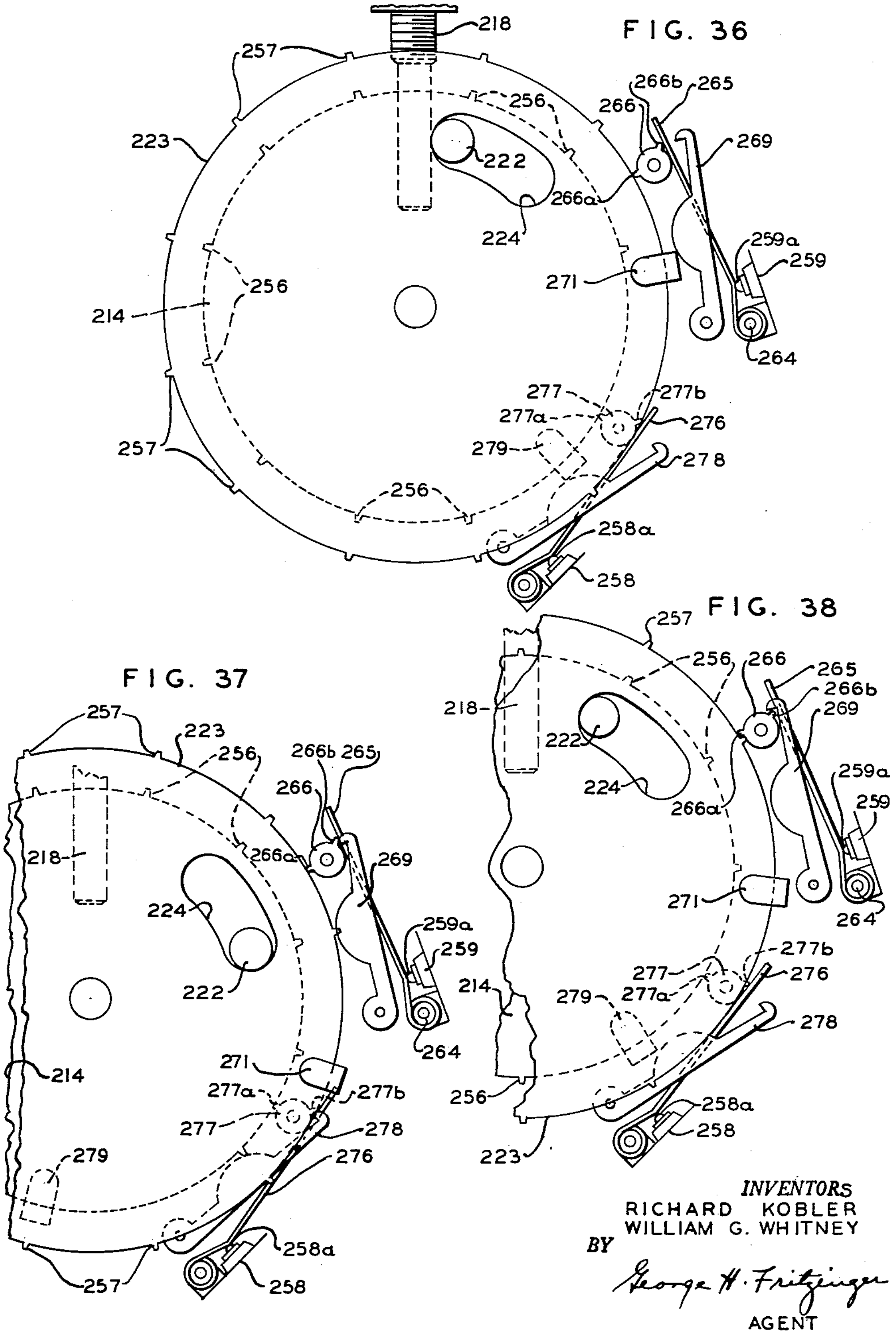
Figure 39:
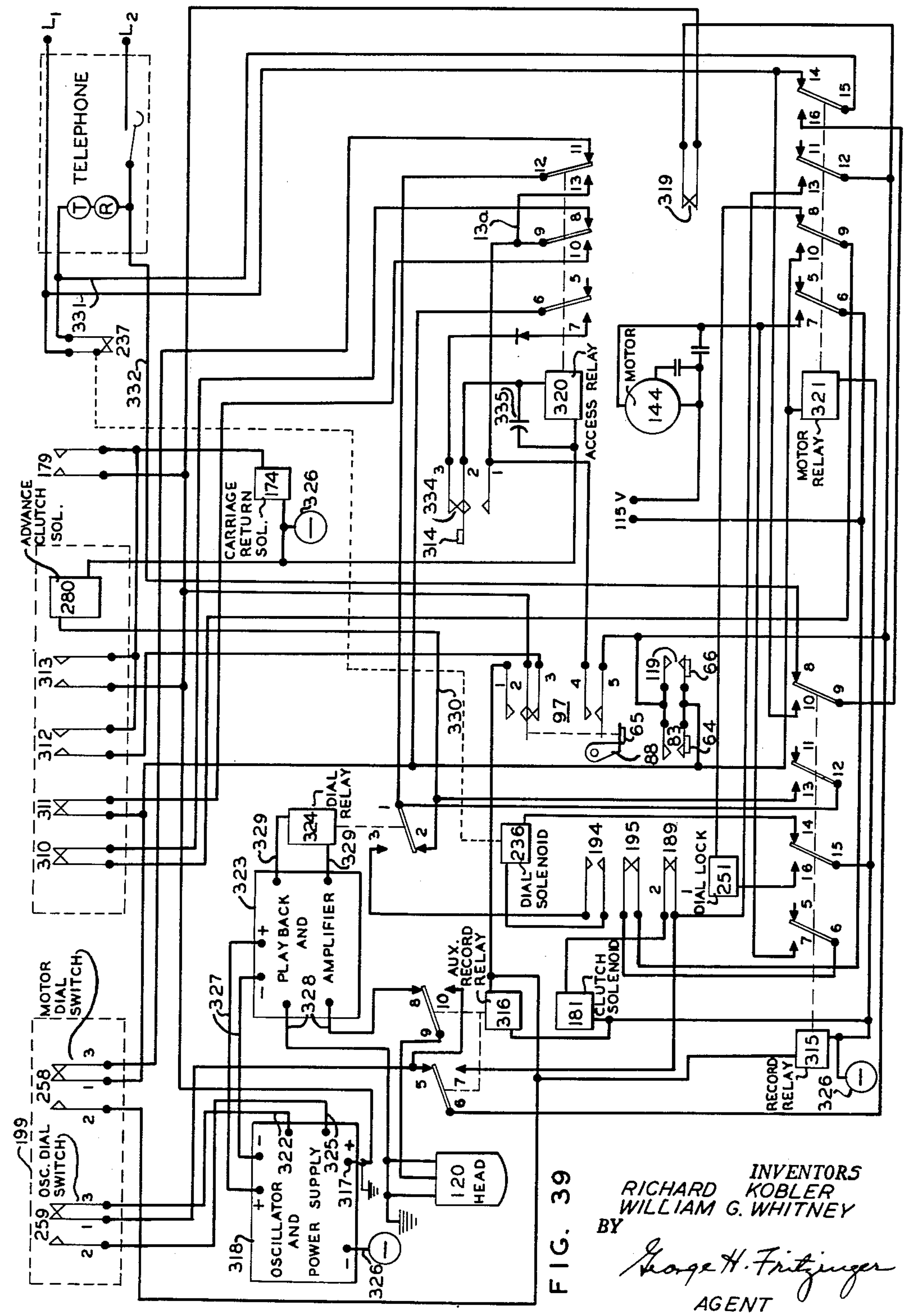

FIGURE 28 is a bottom view of the head carriage shown in FIGURE 27;

FIGURE 29 is a right-hand view of the scanning-lock mechanism as seen from the line 29—29 of FIGURE 5;

FIGURE 30 is a section on the line 30—30 of FIGURE 29 showing the scanning-lock mechanism engaged;

FIGURE 31 is a section taken through the carriage return mechanism as it appears substantially on the line 31—31 of FIGURE 1;

FIGURE 32 is a view of of the dial solenoid as seen from the line 32—32 of FIGURE 21, but showing a portion of the solenoid in section;

FIGURE 33 is a fractional view taken substantially on the line 33—33 of FIGURE 32;

FIGURE 34 is a view of the clutch solenoid as seen from the line 34—34 of FIGURE 3;

FIGURE 35 is a view of certain carriage-operated switches at the home position of the carriage as seen from the line 35—35 of FIGURE 3, the carriage being shown a short distance from home position;

FIGURE 36 is a view of the motor and oscillator gears of the dial mechanism of FIGURE 21, showing the gears in the positions which they occupy when the dial is in home position;

FIGURE 37 shows the positions which the motor and oscillator gears occupy when the dial has been moved clockwise two space intervals to the position for dialing digit 1;

FIGURE 38 shows the positions which the motor and oscillator gears occupy when the motor gear is 50 milliseconds, during return of the dial, from home position; and FIGURE 39 is a schematic circuit diagram of the machine.

The machine comprises a cabinet 1 having a lower pan-shaped section 1 and an inverted pan-shaped cover 3 provided with a downwardly sloping wall throughout the forward one-third portion of the machine as indicated in FIGURES 2 and 3. Mounted on the lower section 1 is a baseplate 2 and suitable secured to the base plate are upstanding laterally-spaced side frame plates 4 and 5 of the shape shown in FIGURE 2, there being the plate 4 at the left side of the machine and the plate 5 about ¼ the width of the machine from the right side thereof as shown in FIGURE 1. Also, there is a smaller intermediate side frame plate 6 in the forward portion of the machine about midway the width thereof, which is supported by two horizontal studs 7 staked to the right side plate 5. The base and the three side plates form the frame of the machine.

At the front of the machine there is a subscribers' list finder comprising a writing tape 8 about one half the width of the machine (FIGURE 1) carried in the manner of a scroll between two relatively long drums 9 and 10 (FIGURE 3). This is a relatively long tape about 72 inches long, having sprocket holes 11 in its side borders. It is wrapped throughout its length onto the drum 9, then led upwardly across a writing platen 12 and over a sprocket drum 13 in driving engagement therewith, and next downwardly onto the drum 10. These drums are mounted on respective shafts journaled in bearings in the side plates 4 and 6. For instance, the drum 9, partially shown in section in FIGURE 13, has a flanged end wall 14 pinned thereto and to its shaft 15. The end wall is recessed to receive a roller bearing 16, the outer race of which is fitted into the intermediate side plate 6. A bowed spring 17 between the end wall of the recess and the bearing exerts longitudinal thrust against a thrust bearing (not shown) at the left end of the drum to hold the drum against end play. The mounting of the drum 10, shown in FIGURE 12, differs in that its flanged end wall 18 has a bearing 19 journaled on its shaft 20 and in that the drum is connected to the shaft 20 through a torsion spring 21. As shown in FIGURE 4, respective gears 22 and 23 are secured to the shafts 15 and 20 at the right side of the intermediate side plate 6, and these gears are inter-coupled and held in fixed rotational relationship by an intermediate gear 24 meshing therewith. After leading the tape across the platen 12 and sprocket drum 13 as above described, the drum 10 is turned clockwise (FIGURE 3) through about 3 revolutions on its shaft to provide a corresponding windup of the torsion spring 21 before the end of the tape is secured to this drum. The torsion spring then holds the tape 8 under constant tension, nothwithstanding the changing diameters of the rolls of tape on the drums as the tape is wound throughout its length from the drum 9 to the drum 10 and back again, because of the three turns by which the spring 21 is tensioned before the end of the tape was attached to the drum 10.

Figures 7, 8, 9, 10, 11, 12, 13:
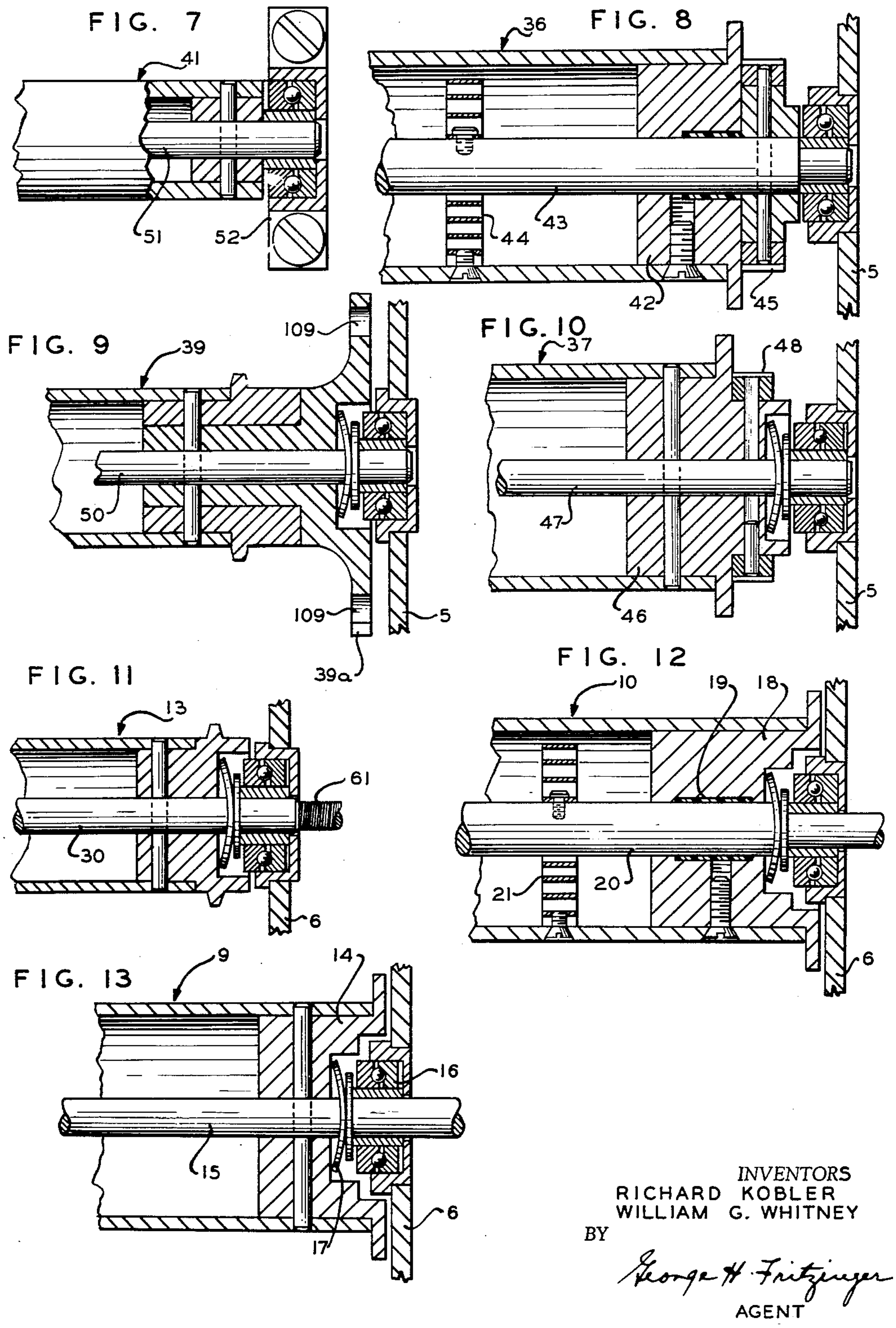
FIGURES 7–13 are axial sectional views to enlarged scale of the right-hand portions of the drums forming the supporting mechanism for the magnetic record tape and the subscribers-writing tape, taken on horizontal lines through the axis of the respective drums identified in FIGURE 3.

The tape 8 is reeled manually by a knob 25 at the right side of cabinet 1. This knob is mounted on a transverse shaft 26 journaled in the side plates 4 and 5. Secured to this shaft at the left side of the side plate 4 is a large gear 27 (FIGURE 2) which is coupled through an idler gear 28 to a gear 29 secured to the left end of a shaft 30 which carries the sprocket drum 13. This sprocket drum is mounted in the manner of the drum 9, as shown in FIGURE 11 and need not be therefore further described. The tape 8 is driven by its engagement with the sprocket drum 13 as the latter is rotated by the knob 25.

As will appear, the names of the subscribers whose telephone numbers are to be recorded by the machine are written as a list on the tape 8. To this end the cover 3 has an opening over the writing platen 12 which is closed by a transparent glass or window 31 except for a narrow transverse slot 32 in the window shown in FIGURE 1. In order that the user may write the subscribers' names in alphabetical order lengthwise of the tape, an alphabetical scale 33 is provided below the window 31 and an index line 34 is provided generally diagonally of the tape lengthwise thereof. However, in order that the respective space provided for the letters of the alphabet will be about in proportion to the numbers of names starting with the respective letters, the index line 34 is stepped unequally as shown in FIGURE 17.

In using the subscribers' list finder the user will turn the knob 25 until the index line 34 comes in alignment with the letter of the alphabet on the index 33, which is the first letter of the subscriber's name. He will then write the subscriber's name on the tape 8 through the slot 32 in the window 31. The subscriber's telephone number will then be recorded in the machine while the list finder is in that position. Similarly, whenever a particular subscriber's telephone number is to be called, he will first turn the knob 25 until that particular subscriber's name appears through the slot 32, using the alphabetical scale 33 and index line 34 as a guide, and then he will put the machine into reproducing to dial the subscriber's number into the telephone line, as will appear.

The telephone numbers are recorded on a long magnetic tape 35 also supported for example in scroll fashion between a pair of relatively long drums 36 and 37 which span substantially the distance between the side plates 4 and 5 (FIGURES 1 and 3). The tape is wrapped on the upper drum 36 and is led downwardly therefrom across the backside of a fixed recording platen 38. The tape is then led partially around a sprocket drum 39 with which it has a driving engagement by reason of it being provided with the sprocket holes 40, and is then led partially across an idler drum 41 to the lower drum 37 to which the leading end of the tape is secured. The drums 36, 37 and 39 have respective shafts journaled in bearings provided in the side plates 4 and 5. For instance, as shown in FIGURE 8, the drum 36 has a flanged end wall 42 secured thereto and journaled on its shaft 43, and the drum is coupled to the shaft through a torsion spring 44, in the same manner as the drum 10 above described. However, a gear 45 is pinned to the shaft 43 between the end wall 42 and the end bearing of the shaft. As shown in FIGURE 10, the drum 37 has a flanged end wall 46 pinned to the drum and to its shaft 47, and provided integrally with this end wall is a corresponding gear 48. The gears 45 and 48 are inter-coupled by a gear-type rubber belt 49, shown in FIGURE 3, to retain the shafts of the drums 36 and 37 in a fixed rotational relationship. The sprocket drum 39, fractionally shown in FIGURE 9 is pinned to a shaft 50 journaled in the side plate 5 in the manner of the sprocket drum 13 before described. Similarly, the idler drum 41 is pinned to its shaft 51, as shown in FIGURE 7, but this shaft is journaled at its right end in a pedestal bearing 52 clamped to the base plate 2 as shown in FIGURE 3. As indicated in FIGURE 1, the drums have similar flanged end walls and bearings at their other ends which need not however be specifically shown and described.

When, in the mounting of the tape 35, the same has been led from the supply drum 36 to the takeup drum 37, the latter is turned by hand until the torsion spring 44 is tensioned via the belt 49 about three turns, and then the leading end of the tape is secured to the drum 37. Since the supply drum is in this case the one rotatably mounted on its shaft instead of the take-up drum as in the case of the writing tape 8, the torsion spring 44 maintains the magnetic tape 35 under constant tension throughout its reeling from the drum 36 to the drum 37 and back again, in the same manner as has been described in connection with the writing tape 8.

The manual knob 25 is coupled to the magnetic tape 35 through the gear 27 and idler gear 53 and a gear 54 on the left end of the shaft 50, as shown in FIGURE 2. In this manner the writing tape 8 and the magnetic tape 35 are always maintained in the same positional relationship lengthwise thereof relative to the respective platens 12 and 38, it being understood that as the knob 25 is turn in a forward direction to advance the writing tape 8 upwardly across the platen 12, the magnetic tape is advanced correspondingly in a downward direction across the backside of the platen 38. In order that the tapes will be detented for receiving successive subscriber's names and the recordation of their respective telephone numbers at regular intervals therealong, a sprocket wheel 55 is provided integrally with the gear 54 (FIGURE 2) and is engaged by the roller of a detent lever 56 under influence of a tension spring 57. The detent lever is pivoted at 58 to a bracket 59 which is adjustably mounted at 60 on the side plate 4.

The tapes 8 and 35 are prevented from being unreeled from either their supply or take-up drums by providing the shaft 30 of the sprocket drum 13 with a screw threaded extension 61 which extends rightwardly past the intermediate frame plate 6 nearly to the side plate 5 as shown in FIGURE 1. The right end of this shaft is carried by a thrust bearing 62, mounted on an arm extending from a collar 62*a* adjustably secured to the adjacent stud 7. Threaded on the extension 61 is an arm 63 constrained against rotation by having a recessed end portion in slidable engagement with the adjacent stud 7. Respective nuts 61*a* are threaded onto end portions of the extensions 61 and are locked in their adjusted positions by respective set screws so that they will form abutments against which the arm 63 cannot be further moved whereby to provide adjustable end limits one the reeling of the tapes.

The machine has the following manual controls: A depressable playback bar 64 positioned below the window 31 and extending nearly throughout the width of the machine, a downwardly shiftable record button 65 at the left end of this window, and a downwardly shiftable reset button 66 at the right end of the window. A cover plate 32*a* overlies the writing slot 32 and is secured to the record button 65 so that it closes the slot except when the record button is pressed forwardly into an operated position to condition the machine for recording. In order that dust may not get into the machine while the slot is open the edge of the slot is sealed slidably with the writing tape by felt stripping 32*b*. Also, to prevent possible ingress of dust into the machine the joint between the housing sections 1 and 3 is sealed as by felt stripping. These precautions against any ingress of dust are taken to prevent dirt and dust from getting onto the recording tape 35 where, because of magnetic attraction, it tends to accumulate and ultimately interfere with the proper recording and reproducing of the code signals representing the telephone numbers.

Also, a partition wall as of a thin plastic is interposed between the drums 9, 10 and 13 carrying the writing tape 8 and the drums 36 and 37 carrying the recording tape 35, throughout the width between the frame plates 4 and 6, as generally indicated by a dash dot line P in FIGURE 3.

The playback bar comprises a bail 67 having an arm 68 and its right end (FIGURE 3) pivoted to a suitable bracket (not shown) and a similar arm 68*a* at its left end (FIGURE 2) pivoted at 69 to the side plate 4. This bail is covered by a flanged plate 70 as shown. The playback bar is held in raised position shown in FIGURE 3 by a depressible key 71 (FIGURES 3, 5 and 15) having a lower portion of reduced width extending slidably through a guide slot in the bottom wall of an L-shaped channel bar 72, and having a wider upper portion extending slidably through a guide slot in a plate 73 mounted on lugs 74 turned over from the upright side of the L channel bar. The channel bar is supported in a slightly elevated and forwardly inclined position on a bracket plate 75 itself secured to and extending forwardly from the base plate 2. The key 71 is urged upwardly by a compression spring 76 interposed between a shoulder of the key and the bottom side of the channel bar, the upper position of the key being defined by abutment of the wider portion of the key against the underside of the plate 73 as shown in FIGURE 15. A latching bail 77 positioned behind the channel bar is pivoted at 78 on ears depending from the channel bar 72, and is urged forwardly against the key 71 by a tension spring 79 connected between a stud 80 at its left end and a cross rod 81 carried by a series of upright posts 82 mounted on the bottom wall of the L channel bar. When the playback bar is depressed a tooth 71*a* on the back edge of the key 71 is cammed past the bail and is then caught therebelow to latch the key in a depressed position (FIGURE 15). The key operates against a button 83*a* of a playback switch 83 hereinafter described.

The record button 65 is bracketed to a vertical plate 84 (FIGURE 2) itself slidably mounted on the vertical side frame plate 4 by screw slot connections 85. A tension spring 86 connected between a lug 87 on the plate 84 and the side frame plate urges the record button rearwardly. A spring latch 88 positioned in front of the button prevents accidental operation of the button since the user must press the latch to the side free of the button before the button can be shifted into its record position. Pivoted to the forward end of the record button is a link 90 which depends angularly forwardly therefrom and is pivoted near its lower end, at 91, to a nearly horizontal lever 92 extending forwardly from a cross shaft 93 journaled in the upper end portions of the aforementioned posts 82 (FIGURES 2 and 14). On the rear end of the lever 92 there is a tooth 92*a* which is cammed below the latching bail 77 to latch the record button as the same is moved into its record position. Secured to the right end portion of the shaft 93 is a short upstanding arm 95 which is moved into a locking position to prevent the playback bar 64 from being depressed when the record button is in "on" position. Also secured to the shaft 93 is a rocker arm 96 (FIGURE 5) which is moved against a push button switch 97 as the record button is moved into its "on" position.

At the lower end of the link 90 there is a roller 98 which is moved against an arm 99 on a cross shaft 100 journaled rearwardly of the latching bail in a bearing 101 at the left side of the machine and a bearing 102 offset inwardly from the right side of the machine (FIGURES 3 and 5). The shaft 100 is urged counter clockwise as it appears in FIGURE 2 by a torsion spring 103 (FIGURE 5) between a lever 104 secured to the shaft and the bracket which supports the bearing 102. The lever 104 is a relatively long one extending rearwardly from the shaft 100 and having its rearward portion offset to the right of the intermediate frame plate 5. At the end of the lever there is an upwardly extending cam finger 105. Mounted slidably in a cylindrical housing 106 which is bracketed to the side frame plate 5 is a plunger 107 urged rightwardly into a retracted position by a compression spring 107*a* (FIGURES 5 and 30). In each detented position of the recording tape the plunger is axially in line with one of a series of holes 109 provided in the flanged end plate 39*a* of the sprocket drum 39. When the shaft 100 is turned clockwise by depressing the record button, the plunger 107 is cammed leftwardly to engage the respective hole 109 in the end plate 39*a* and thereby lock the sprocket drum 39 so that the user cannot shift the tape by the knob 25 while the machine is in record condition. Also as the playback bar 64 is depressed it is moved against an arm 108 secured to the shaft 100 (FIGURES 5 and 15) to turn the shaft clockwise and lock the tape support in the same manner. When either the record button or playback bar are returned to neutral—it being understood that only one can be in an operate position at any one time—the shaft 100 is moved to release the plunger 107 and free the sprocket drum 39. A bracket 110 on the side plate 5 has an arm overlying the lever 104 to provide a stop for the lever, as shown in FIGURES 5 and 29, when the record button or playback bar is operated.

The reset button 66 is bracketed to a vertical plate 111 mounted slidably by pin slot connections 112 on the intermediate side plate 6 (FIGURE 4). This button is urged rearwardly into a neutral position by a tension spring 113 connected between the plate 111 and the frame plate 6. Pivoted to the forward end portion of the slide plate 111 is a short link 114 which extends below the playback bar and is there pivotally connected at 115 to a side ear 116 on the intermediate portion of a transverse lever 117 (FIGURES 4, 6 and 16). This lever is pivoted at its left end to an upstanding lug 73*a* of the plate 73, and overlies at its right end a vertical key 118 mounted slidably in the manner of the key 71 and biased upwardly by spring 118*a*. When the reset button is pressed forwardly the lever 117 is depressed against the key 118 to operate a reset switch 119 connected in parallel with the playback switch 83; as will appear, this operates to restore the machine to a neutral or standby condition. The reset button is never latched but is returned by the spring 113 as soon as the operator releases his finger from the button. However, the reset key 118, like the playback key 71., has a cam tooth 118*b* (FIGURE 16) which becomes latched underneath the bail 77 when the key is depressed, requiring therefore that the latching bail be shifted rearwardly to restore the reset key and the reset switch.

At the rear of the record platen 38 (FIGURE 3) is a magnetic record head 120 of the usual form having a magnetic core provided with pole pieces for engaging the record medium and recording thereon in response to signal currents fed into a winding on the core. The head is rectangularly shaped and is mounted slidably on a carriage 121 for movement into and out of engagement with the record. The carriage is of a block shape having a large transverse bore 122 and an upstanding arm 123 as shown in FIGURE 26. The arm has an open-ended slot 124 for receiving a bearing 127 as shown in FIGURE 27. The bore 122 is undercut near each end, and fitted therein are split rings 125 as of nylon to form bearings for the carriage on a transverse support tube 126 mounted at its ends in the side plates 4 and 5. The bearing 127 made also for example of nylon slides on a transverse rod 128, supported at its ends by the side plates 4 and 5, to hold the carriage from turning on the support tube 126. Clamped to a bottom face 121*a* of the carriage is an L-shaped bracket plate having a lug 129 extending upwardly across the back side of the carriage, and clamped against the bracket plate is a channelled bar 130 in which is slidably mounted the head 120. The channelled bar is covered by a bracket plate 138 having a lug 139 extending downwardly at the back side of the carriage and overlying this bracket plate is a cover plate 131. These different plates and channelled bars are held in place by dowel pins 132 and screws 133 as shown in FIGURE 28. This assembly provides a rectangular guideway at right angles to the record platen for the recorder head. The bracket plate 138 and cover plate have slots 134 extending lengthwise of the guideway through which extends a post 135 secured to the recorder head. Riveted to the outer end of this post and extending rearwardly of the carriage in the direction of the guideway is a pin 136 provided with a conical head 137. The lug 139 has an opening providing a bearing for the pin 136. Interposed between the lug 139 and post 135 in surrounding relation to the pin 136 is a compression spring 140 which urges the recorder head forwardly against the tape backed by the recording platen 38.

The support tube 126 has a feed screw 141 running lengthwise therethrough, which is journaled at its ends in bearings supported by the side frame plates 4 and 5. The right end portion of this feed screw extends through the side plate 5 and has a gear 142 mounted thereon and engaging a worm 143 on the shaft of a drive motor 144. This motor is mounted in an inclined position to the right of the side plate 5 as shown in FIGURES 1 and 18. The supporting tube 126 has a slot 145 running lengthwise thereof throughout the distance of travel of the carriage. Journaled on a stud 146 of the carriage is a circular feed nut 147 which extends through this slot into engagement with the feed screw. The circular feed nut has a ratchet wheel 148 secured thereto which is engageable by a pawl 149 provided as an arm portion of a rocker plate 150 (FIGURE 26). This rocker plate is mounted rotatably at the back side of the carriage on a stud 151 riveted to the lug 129 as shown in FIGURE 27. The rocker plate is biased over center by a torsion spring 152 having one end thereof anchored to a pin 153 mounted on the carriage and extending through a clearance slot 154 in the rocker plate, and having the other end thereof anchored to a pin 155 on the rocker plate. The rocker plate has a tapered arcuate cam finger 156 for engaging the underside of the conical head 137 and withdrawing the recorder head from the record as the rocker plate is turned clockwise to disengage the pawl 149 from the ratchet wheel 148. Thus, when the rocket plate is in a counterclockwise position shown in FIGURE 26, the pawl engages the ratchet wheel to lock the feed nut 147, and the head 120 is in engagement with the record. This is the positioning of the rocker plate for recording on or reproducing from the record. When the rocker plate is shifted clockwise the recorder head is moved from the record by the cam finger 156 engaging the underside of the conical head 137, and the pawl 149 is disengaged from the ratchet wheel 148 to allow return of the carriage to its home position.

The carriage is driven by the feed screw 141 in a leftward direction as it appears in FIGURE 1. When the circular feed nut is unlatched the carriage is returned instantly to home position by a spring-tensioned drum 157 on which is wound a string 158 that leads therefrom and is connected to the carriage at 158*a*. As shown in FIGURE 31, there is a coil spring 159 in the drum, which is secured at its inner end to a stationary drum 160 held by a shouldered stud bolt 161 and a dowel pin 162 to a bracket 163 which in turn is secured by screws to the frame plate 5. The coil spring 159 is secured at its outer end to the rotatable drum 157. This outer drum has a long internal bearing 164 rotatably mounted within the stationary drum on the stud bolt 161.

The rocker plate 150 has also a side arm 167 onto the end portion of which there is journaled a roller 168. Extending crosswise of the machine below this roller throughout the length of travel of the carriage is a bail 169 shown in FIGURE 1. This bail extends through openings 170 in the side frame plates 4 and 5 as shown in FIGURE 2. It has side arms pivoted at 171 and 172 to the outer sides of these side frame plates. The bail 169 is coupled at its left end by a link 173 to the latching bail 77 and is through this coupling normally held in a downward position at a clearance distance below the roller 168 by the spring 79 connected to the latching bail. A carriage-return solenoid 174 is mounted on the inner side of the side frame plate 4, in a downwardly inclined position as shown in FIGURE 2, and has its armature coupled by means of a link 175 to an apertured lug 176 secured to the bail 169. When the solenoid is energized it propels the bail 169 obliquely upwardly against the roller 168 to turn the rocker plate and disengage the feed nut 147 as well as to lift the recorder head from the record. At the same time, the solenoid disengages the latching bail 77 through the link 173. Thus energization of the solenoid 174 causes the carriage to be returned to home position and also causes the record or reproduce controls, depending on whether the machine is in record or reproduce condition, to be returned to neutral position.

If the carriage is driven to the far end of its travel a tapered pin 177 riveted to the upper end of the arm 123 of the carriage (FIGURES 1, 27 and 35) is moved through an opening 178 (FIGURE 2) in the left side plate 4 to depress a button of an end switch 179 by a camming action there against. This operation of the end switch causes the carriage-return solenoid 174 to be operated to return the carriage as is later described.

Secured by a bracket 180 to the base plate 2, at the rear of the home position of the carriage, is a clutch solenoid 181 as shown in FIGURES 1, 3 and 34. This clutch solenoid has an armature 182 provided with an open ended slot 183 through which extends the lower end portion of a lever 184 connected thereto by a pin 185.

The lever 184 is pivoted on a stud 186 riveted to an upstanding lug 187 of the bracket 180. A torsion spring 188 on the stud 186 biases the lever 184 in a counterclockwise direction normally to hold the armature 182 in an outer or unoperated position. Upon energizing the clutch solenoid, the lever 184 is propelled clockwise to cause an upper side arm 184a thereof to strike downwardly against the roller 168 and shift the rocker plate 150 over center in a counterclockwise direction as it appears in FIGURE 26. This releases the recorder head into engagement with the record and it latches the feed nut 147 to start the forward drive of the carriage across the record.

Secured by a bracket to the side plate 5 above the home position of the carriage 121 is a switch 189 for controlling the clutuch solenoid (FIGURE 35). This switch has a push button facing in the direction of advance of the carriage across which extends a horizontal operating lever 190 having a pivot at 191. Secured to the right side of the carriage arm 123 by the rivet portion of the pin 177 is a bracket arm 192 extending rearwardly of the carriage. This arm has a shoulder 192a which is moved against the outer end of the lever 190 to operate the switch 189 closed at the very end of the return movement of the carriage into its home position.

Positioned at the front side of the upper portion of the carriage on a bracket 193 secured to the side plate 5 are so-called mute and jog switches 194 and 195 (FIGURES 3 and 35). These switches have push buttons operable by a common lever 196 pivoted at 197 to ears turned over from a bracket 198 at the end of the switches. As the carriage enters an end zone of its return movement the arm 192 cams the lever forwardly to operate the mute and jog switches as later explained. Suffice to say for the present that the jog switch—which is closed when the carriage is in home position controls the carriage advance mechanism to cause the carriage to be advanced a predetermined distance from home position when the record button is pressed and that the mute switch serves during reproducing to open the circuit to the dialing mechanism during the travel of the carriage through this same predetermined advance when the playback bar is depressed.

In the right forward portion of the machine there is a telephone type dial 199 provided with the usual finger holes 200, finger stop 201 and plate 202 bearing the digits and letters at the intervals of spacing between the finger holes. (FIGURES 1, 18 and 21). The rotatable dial is secured by a center screw and pins, generally referred to as 203, to an enlarged head portion of a shaft 204 extending upwardly through a clearance hole 205 in the cover 3 of the housing. The shaft is journaled in spaced upper and lower bearings 206 supported in upper and lower parallel plates 207 and 208 of a cast U-shaped frame 209 shown in FIGURE 23. Depending obliquely from the lower plate 208 of this cast frame is a leg 210 terminating in a foot portion 211 secured to the base plate 2 for supporting the dial mechanism in a forwardly inclined position. A sleeve 212 is mounted on a central portion of the shaft 204 and is locked thereto by an expansion type roll pin 213 as shown in FIGURE 21. This sleeve has a reduced lower end portion on which a gear 214 is keyed by pins 215 integral with a collar 216 surrounding the shaft 204. This gear 214 is hereinafter referred to as the motor gear since it controls a switch of the drive motor 144 as later explained. Above this gear there is a drum 217 mounted rotatably on the sleeve 212 but held from turning with respect to the frame 209 by means of a horizontal stud bolt 218 (FIGURES 20 and 23) threaded through the left hand vertical wall portion of the frame 209 and engaging a hole in the drum. A coil spring 219 is mounted within the drum in surrounding relation to the sleeve 212 and has its inner end secured to this sleeve and its outer end secured at 221 to the drum. This spring provides the force for returning the dial to home position each time the finger is released from a finger hole of the dial after the dial has been turned in a clockwise direction. The home position of the dial is defined by the abutment of an upright pin 222 on the motor gear 214 against the stud bolt 218 as shown in FIGURE 23. Above the sleeve 212 and drum 217 there is a second gear 223 rotatably mounted on the shaft 204. This gear is hereinafter referred to as the oscillator gear because it controls a switch in the oscillator circuit as later described. This oscillator gear is locked to the motor gear 214 by a lost-motion coupling provided by an elongate slot 224 in the oscillator gear through which the pin 222 extends (FIGURES 23 and 36). When the dial is at rest the oscillator gear may stand in any position within its range permitted by its lost-motion coupling with the motor gear.

The motor 144 is mounted with its end face flat against the back face of the leg 210 of the frame 209 by means of screws 225 (FIGURE 21). The shaft of the motor extends forwardly through a clearance hole 226 in the leg 209. Mounted on the forward end of the shaft is a bevel gear 227 meshing with another bevel gear 228 secured to the lower end of an upright shaft 229. This shaft has a lower portion of larger diameter journaled in a bearing 230 directly above the bevelled gear 228. This bearing is mounted in an L bracket 231 secured by the screws 225 to the front side of the leg 210 of the frame 209. Rotatably mounted on the shaft above the bearing is a cam 232 shown in FIGURE 21. At some distance above the cam the shaft 229 is reduced in diameter to provide it with a shoulder 233. Freely rotatably mounted on the shaft against this shoulder is a dog 234 having a shape as shown in FIGURE 33. The dog and cam are interconnected by a coil spring 235 operating as a one-way clutch with respect to the shaft. This coil spring lightly embraces the shaft 229 and has such direction of wind relatively to the direction of drive of the shaft by the motor that when the dog is held against being rotated the frictional engagement of the shaft with the coil spring is released but that when the dog is released to turn with the shaft the frictional drag on the cam causes the spring to tighten up and lock the cam to the shaft. The dog is normally held at standstill to prevent the cam from turning by a dial solenoid 236. However, the instant the dog is released the cam will turn with the shaft to intermittently operate a switch blade of a dial pulse switch 237 (FIGURE 22). This dial pulse switch 237 is operated only during playback to produce the dialing pulses which are fed into the telephone line to make the desired calling connection.

Directly above the dog 234 on the shaft 229 is a sleeve 238 locked to the shaft by a cross pin 239. Freely rotatably mounted on the shaft 229 above the sleeve 238 is a second sleeve 240 of the same outer diameter. These sleeves have flanges 238a and 240a spaced equidistantly from their junction line to confine therebetween a one-way clutch spring 241. This spring bridges across the two sleeves and is slightly tensioned thereon. Integrally formed on the sleeve 240 above the flange 240a is a pinion gear 242 meshing with the oscillator gear 223, and above this gear is a bearing 230a in the frame plate 207 for the upper end of the shaft 229. The direction of wind of the clutch spring 241 is such that the clockwise rotation of the shaft 229 by the motor 144, as it appears in FIGURE 23, tends to unwind the lower portion of the spring 241 and thereby release it from the sleeve 238, and the counter-clockwise rotation of the sleeve 240 during the windup of the dial tends to unwind the upper portion of the spring 241 and release it also from this sleeve. On the other hand, during return of the dial from an operated position the clockwise rotation of the pinion gear 242 and sleeve 240 will by the frictional coupling of the latter with the spring tend to wind up the spring and lock the sleeve 240 to the shaft 229 via the lower sleeve 238. The return spring 219 is so made that it tends always to return the gear 223 at a faster speed than the motor tends to return it through the clutch spring 241, with the result that the sleeve 240 is held locked to the shaft 229 by the clutch spring 241 during the return of the dial. The motor therefore acts as a brake on the return spring 219 and controls the speed of unwind of the dial.

After the dial is returned the oscillator gear may be further driven in the return direction, within the range of its lost-motion coupling with the motor gear, by the motor acting through the clutch spring 241 in the unwind direction of the latter. This further drive is indefinite, depending on the natural tightness of the clutch spring 241, on the sleeves 238 and 240, the resisting force of the oscillator gear, etc., with the result that the oscillator gear may stop anywhere within its coupling range just mentioned with the motor gear as shown in FIGURE 38. Such indefinite further return of the oscillator gear is unimportant however to the operation of the dialing mechanism.

During windup of the dial, whatever slack which exists between the motor and oscillator gears in the clockwise direction is first taken up and then the two gears are moved in unison by the driving engagement which the pin 222 of the motor gear has against the clockwise end of the slot 224 in the oscillator gear. Upon the release of the dial from an operated position the motor gear is at first moved quickly in a counterclockwise direction through the distance allowed by the travel of the pin 222 in the slot 224, because of the overdriving influence of the spring 219, but once the pin 222 reaches the counterclockwise end of the slot 224 the motor gear is restrained by the return speed allowed the oscillator gear by the motor 144 before explained. In order that the return of the dial will not be unduly fast before the gear becomes restrained by the motor acting as a brake on the oscillator gear, a governor 243 is provided on the motor gear during the return thereof to home position (FIGURES 23 and 25). This governer comprises a fly wheel 244 journaled on a stud 245 threaded into the frame plate 208. The fly wheel is provided with an annular recess open at the bottom to form an internal hub 244*a*. Positioned on the stud below the fly wheel is a pinion gear 246 having a hub conforming in diameter with the hub of the fly wheel. These two hubs are bridged by a coil spring 247 which operates as a one-way clutch between the fly wheel and pinion gear. A gear 248 on a stud 249 couples the gear 246 and fly wheel to the motor gear 214. The direction of wind of the clutch spring 247 is such that during windup of the dial the frictional forces on the coil spring tend to unwind it and uncouple the dial from the fly wheel, but during return of the dial these frictional forces tighten the coil spring 247 to couple the fly wheel to the motor gear.

Mounted on the lower frame plate 208 at the left side of the motor 144 there is a dial-lock solenoid 251 (FIGURE 21). This solenoid has a plunger type armature 252 which extends upwardly through a clearance hole in the frame plate 208. The upper end of this armature engages a recess 254 in the bottom face of the motor gear under influence of a backing spring 255 to hold the motor gear and dial normally locked. Thus, only when the solenoid 251 is energized to release the motor gear from its latched condition can the dial be operated.

The motor gear 214 is provided with long peripheral recesses at regular intervals through about half its thickness to form the gear with 10 spaced teeth 256 corresponding respectively to the finger holes in the dial (FIGURE 36). Likewise, the oscillator gear 223 has long peripheral recesses at regular intervals throughout half its thickness to form 10 teeth 257 corresponding also to the finger holes in the dial. The regular teeth of these two gears have the same pitch but the motor gear being smaller in diameter than the oscillator gear, has 120 teeth and the oscillator gear 144 teeth. The spaced teeth 256 of the motor gear are at intervals of 10 teeth of the gear proper and the spaced teeth 257 of the oscillator gear are at intervals of 12 teeth of the gear proper. The spaced teeth of each gear have a peripheral span of 270°, leaving a separation of 90 degrees between the first and last of the spaced teeth, as shown in FIGURE 36. With respect to the time which elapses during return of the dial from an operated position, the teeth 256 and 257 are separated respectively at 100 millisecond intervals. The teeth 256 and 257 of the motor and oscillator gears are provided for the purpose of operating respective motor and oscillator switches 258 and 259 (FIGURE 36).

The operating means for the oscillator switch 259 is provided on a mounting arm 260 (FIGURES 21 and 23) which is pivotally adjustable about the upper bearing 206 and which extends radially therefrom across the underside of the upper frame plate 207, the arm having a step 260*a* beyond the frame plate to provide the outer portion of the arm with a greater thickness. Threaded into the upper side of this mounting arm about midway its length is a screw 261 having a flat head overlying a curved edge 262 of the frame plate 207 to enable the mounting arm to be adjusted in position about the pivot axis of the oscillator gear as a center and to be then secured in place by the screw 261. Secured by screws 263 to the underside of the mounting arm 260 beyond the periphery of the oscillator gear is the oscillator switch 259. Pivoted at 264 to a bracket held by the screws 263 to the mounting arm is a lever 265 extending counterclockwise relative to the oscillator gear from its pivot axis past the push button of the oscillator switch. Between the far end of this lever and the oscillator gear there is a two lobe cam 266. As shown in FIGURE 24, this cam is journaled on a stud 267 staked to the underside of the mounting arm 260. The cam is biased to a center position as it appears in FIGURES 23 and 36 by a torsion spring 268 which allows the cam to be turned in either direction. In its mid position one lobe 266*a* of the cam engages the peripheral recesses of the oscillator gear and the other lobe 266*b* stands just counterclockwise from the switch lever 265. A latching pawl 269 for the cam is pivoted at 270 to the mounting arm 260 and extends past the outer side of the cam 266.

When the oscillator gear is in home position, a peripheral pin 271 thereon contacts a central lobe of the latching pawl 269 to hold it disengaged from the cam. As the oscillator gear is turned clockwise by winding up the dial the latching pawl is first released against the cam and the successive teeth 257 of the oscillator kick the cam in a counterclockwise direction but this has no effect on the switch lever 265 because it now engages a portion of uniform radius of the cam. When the finger reaches the finger rest the cam 266 will stand midway between two of teeth 257 (FIGURE 37). During the return of the oscillator gear following release of the dial the first adjacent one of the teeth 257 in a clockwise direction from the cam 266 will engage the lobe 266*a* thereof and kick the cam clockwise from its mid position. As a result of this movement the other lobe 266*b* of the cam moves against the switch lever 265, camming it outwardly to operate the oscillator switch. At the same time the lobe 266*b* is engaged by the latching pawl 269 to cause the cam to be latched in its operated position. This holds the oscillator switch in its operative position during the further return of the oscillator gear. As the oscillator gear nears the end of its return movement the pin 271 cams the latching pawl 269 outwardly to release it from the cam 266. This allows the oscillator switch to return to its "off" position.

The actuating means for the motor switch 258 are substantially the same as that described above for the oscillator switch. The motor switch and its operating means are mounted on an arm 272 (FIGURE 23), which pivotally embraces at its inner end the flange of the lower bearing 206. This mounting arm is adjustable about the pivot axis of the oscillator gear and extends from this axis across the top side of the lower frame plate 208. The mounting arm can be secured in its adjusted position to the frame plate 208 by screw slot connecting means 273.

Secured to the top side of the mounting arm 272 by screws 274 is the motor switch 258. Pivoted at 275 to the mounting arm is a switch lever 276 which extends past the push button of the motor switch, and between the outer end of the switch lever and the motor gear is a two lobe cam 277 having one lobe **277*a* contacting the recessed periphery of the motor gear about midway between the first and last of the teeth 256 (FIGURE 36), and having a second lobe 277*b* positioned just counterclockwise from the switch lever. Also, a latching pawl 278 is provided for the cam 277 and a peripheral pin 279** is provided on the motor gear for releasing this pawl.

When the motor gear is in home position the first of the teeth 256 is slightlyl ess than one and one half space intervals counterclockwise from the cam 277 (FIGURE 36) and the first of the teeth 257 of the oscillator gear is from slightly less than one half space interval minimum to slightly less than one and one half space intervals maximum in a counterclockwise direction from the cam 266, depending on the positioning of the oscillator gear within its range of lost-motion coupling with the motor gear. When during the windup of the dial the slack between the gears has just been taken up—which is assured when the dial has been turned clockwise by one space interval—the first of the teeth 256 and 257 stand at about one half space intervals counterclockwise from the respective cams. When the dial has been wound up by two space intervals—the distance for dialing the digit 1—they stand at about one half space intervals past the respective cams as shown in FIGURE 37. Correspondingly, when the dial is turned clockwise to any higher operate position determined by one's finger in the dial abutting against the finger stop, the cams stand about midway between the respectively adjacent teeth 256 and 257.

Upon releasing the dial from an operate position the dial together with the motor gear start returning at a fast speed restrained only by the governor 243, and move through a first one half space interval in about 10 milliseconds to operate the motor switch. The motor starts immediately and comes to normal speed in about 50 milliseconds. During about the first 10 milliseconds of this 50 millisecond start-up period of the motor, the motor gear completes its one space interval of lost-motion coupling with the oscillator gear and thereupon under influence of the overdriving force of the return spring 219 the clutch spring 241 is locked on its sleeves 238 and 240 to allow both gears, as well as the dial, to return only at a speed determined by the motor. In about 60 milliseconds after the motor was started the oscillator gear completes is first one half space interval of return movement to operate the oscillator switch and cause the same to become latched in the same manner as is described above with respect to the motor switch. Thus, during the initial return of the dial from an operate position the motor is started in about 10 milliseconds, the motor reaches normal speed in about 50 milliseconds thereafter, and the oscillator is started about 10 milliseconds later.

When the motor gear has come within about 60 milliseconds from home position during return of the dial, the peripheral pin 279 of this gear engages the latch 278 and releases it to allow return of the motor switch to "off" position. However, this does not now stop the motor but transfers control of the motor to an advance clutch and switch device 280 hereinafter described. About 50 milliseconds after the motor switch is returned the peripheral pin 271 of the oscillator gear engages the latch 269 and releases it to allow return of the oscillator switch to unoperated position. This cuts off the feed of signal to the recorder head as will appear. About 10 milliseconds after the oscillator switch is returned, the motor gear is stopped by the abutment of the pin 222 against the stud 218. The oscillator gear may be moved further counterclockwise within the range of its lost-motion coupling with the motor gear under the driving influence of the motor acting through the spring clutch 241 in the reverse direction thereof, as before explained, but such further movement of the oscillator gear, if it should occur, has no importance in the operation of the dialing mechanism.

The time interval during which the oscillator switch is held on when the digit "1" is dialed is only about 40 milliseconds, being the time expiring from the instant the first of the teeth 257 has just operated the cam 266 (FIGURE 38) to the instant thereafter the peripheral pin 271 releases the latch 269. However, for each higher digit above "1" which is dialed, the time interval that the oscillator switch is held on is increased precisely by 100 milliseconds under the rigid control exercised by the motor on the return of the dial, the time duration for example when the digit "5" is dialed being 440 milliseconds.

The motor 144 is kept running for an interval of about 550 milliseconds after the motor switch is returned to "off" position to provide a blank space on the record of about 500 milliseconds—which is the time interval following return of the oscillator switch—after each digit is dialed. This is accomplished by the advance clutch and switch device 280. This device, which is shown in FIGURES 1, 18 and 19, is mounted behind the home position of the carriage. It comprises a cylindrical housing 281 bolted to the left side of the side frame plate 5 but with an annular plate 282 of magnetic material interposed between the open end of the housing and the frame plate. The frame plate has a clearance opening 283 for extension therethrough of a shaft 284. This shaft is journaled in a bearing 285 in the left end wall of the housing 281 and in a bearing 286 in a yoke 287 secured by screws **287*a* to the right side of the frame plate 5, the yoke having an oblique shape as shown in FIGURE 18 and being provided with feet at each end into which the screws 287*a* are threaded. The shaft 284 extends beyond the left bearing 285 and is secured thereat to a spiral spring 288 which is connected at its outer end to a cup 289 enclosing the spring. The cup fits rotatably in a flanged collar 290 riveted at 291 to the left end wall of the housing in concentric relation to the shaft 284. The cup is adjustable within the collar to change the tension of the spring and is secured against rotation in any adjusted position by a set screw 292 in the collar. The right end of the shaft 284 extends beyond the right bearing 286 and has a cam 293 secured in the form of an arm provided with a roller on the end thereof. This cam is normally held by the spring 288 against a stop pin 294 on the yoke 286** (FIGURE 18).

The shaft 284 has a reduced diameter extending from about midway the housing 281 throughout the right end thereof. A long bushing 295 is journaled via bearings 296 on the reduced portion of the shaft and extends all the way from the shoulder **284*a* on the shaft within the housing 281 to the hub of the cam 293, this bushing being itself also journaled in the right bearing 286. Between the side frame plate 5 and the yoke 287 there is a large gear 297 mounted on the bushing 295 and secured thereto by a set screw 298. This gear has a permanent drive connection (FIGURES 1 and 18) with the motor 144 via the worm 143 meshing with gear 142 on shaft 141, a second gear 142*a* on shaft 141 meshing with a gear 335 on short jack shaft 336 journalled between the frame plate 5 and the yoke 287, and a pinion gear 337 on the shaft 336 meshing with the gear 297. Mounted also on the bushing 295, between the gear 297 and the shoulder 284*a*, is a clutch member 302 which faces leftwardly and has a long rightwardly extending hub secured to the bushing by a key 303. At the left of this clutch member there is cooperating clutch disk 304 which is splined at 305 to the portion of the shaft 284 between the shoulder 284*a* and the left bearing 285. Mounted against the annular plate 282 within a long leftwardly extending annular flange 282*a* thereof is a coil 306. The annular plate 282 and the clutch disk 304 are made of magnetic material to form a magnetic circuit for the coil 306, with the clutch disk acting as a moveable armature, the flange 282***a* being for this reason extended just short of the left face of the clutch member 302 and the clutch member 302 being itself of non-magnetic material. When the coil is not energized rotation of the clutch member 302 by the motor is not imparted to the shaft 284 and the cam 293 is at stand-still against its stop 294. However, when the coil is energized the clutch 302–304 is engaged to cause the motor to drive the shaft 284 and the cam 293 thereon in correspondence with the movement of the head carriage.

Mounted on a shouldered hub 307 of the yoke 287 concentric with the shaft 284 is an annular plate 301 secured thereto by screws 309. This plate supports at angular intervals about the shaft 284 a series of 4 switches 310–313 each having an operating lever referred to by the number of the switch with the suffix letter *a*, at its inner side facing the cam 293. When the clutch 302–304 is engaged the motor turns the cam 293 clockwise to operate the switches 310–313 at time intervals determined by the angular spacing of the switches about the shaft 284 from the zero position of the cam. For instance, as will appear, during return of the dial from an operate position, the advance clutch is actuated the instant the motor switch is returned to "off" position. This keeps the motor running until the cam 293 operates the switch 310, which is about 500 milliseconds after the oscillator switch is returned to "off" position. This provides the needed interdigital spaces on the record between the successive time bands representing in code form the recorded digits of a telephone number.

If a control button 314—which is positioned so as to be available only when the record button 65 is in "on" position and which is therefore herein referred to as an "access" button—is next depressed it restarts the motor and drives the head carriage ahead with the head operating as an eraser until the advance clutch operates the second switch 311. This provides an additional 1450 millisecond blank space on the record. As the switch 311 is operated the motor is stopped, the advance clutch solenoid is de-energized and the cam 293 returned to zero position but the carriage remains in its advanced position across the record. The access button is to be pressed only after first dialing any predetermined digit or digits adapted for making connection to a tie line, the purpose being when such call is made to provide an approximate two second delay to allow the automatic switching apparatus to reach the tie-line connection before the last four digits are dialed.

If after dialing a telephone number the reset button is depressed the motor is restarted, the advance clutch is moved ahead to operate the switch 313 to provide an additional 2500 milliseconds' blank space on the record after which the motor is stopped, the advance clutch is returned to zero position and the head carriage is returned to home position. During playback, when the head enters any blank space of 5 to 10 milliseconds' duration on the record, the advance clutch is activated but the only switch now capable of being operated is the playback advance switch 312 set at 2250 milliseconds. The only blank space on the record in excess of this time interval is the reset space which may vary from 2500 to 3000 milliseconds. As a result, during playback, the advance clutch will be activated the instant each blank space is encountered but will fall back to zero when a signal is encountered after an interval less than 2250 milliseconds. Therefore, only when a reset space of 2250 milliseconds or more is encountered is the carriage returned to home position during playback. These operations will be more fully understood from the following description made particularly with reference to the schematic circuit diagram of FIGURE 39.

In the schematic diagram of FIGURE 39 the dial mechanism 199 is indicated diagrammatically as including the motor dial switch 258 and the oscillator dial switch 259. Also a combined oscillator and power pack 318 is shown diagrammatically as having an A.C. output terminal 322 providing 400 cycle erase current, another A.C. output terminal 325 providing 200 cycle signal current for recording time bands, a D.C. plus terminal 317, which is also ground, and a negative terminal 326 for supplying operating current to the various components of the system. A playback amplifier 323, shown also diagrammatically, is supplied with power from the power pack 318 through a circuit 327, and has an input circuit 328 for connection to the recorder head 120 when used as a reproducer and an output circuit 329 connected to a dial relay 324 for controlling the dial solenoid 236. The telephone line over which calls are made is indicated as $L_1L_2$. The telephone itself is indicated simply as including a receiver R, a transmitter T and the dial pulsing switch 237. As will appear, the dial pulsing switch is shorted by a circuit 331 when the telephone calling machine is in standby condition. Further, the telephone is muted—i.e., the receiver and transmitter are shorted—by a circuit 332 when the machine is operated to call an outside party. Still further, the dial pulsing switch 237 is shorted during such time as the machine is used for recording subscribers' telephone numbers on the magnetic tape.

*Standby Condition*

When the machine is in standby condition the dial mechanism is locked by the dial lock solenoid 251, the record button 65 is latch-locked in off position by the latch 88, the reset button 66—which has been pressed momentarily if the last prior operation of the machine was for recording—stands in its biased off position, the scan lock 105–107 is released permitting the record to be shifted by the knob 25 to select subscribers' telephone numbers to be called, the carriage 121 is held in home position by the spring tensioned drum 158, and the access button 314 is now concealed by the record button 65. The record switch 97 controlled by the record button stands now in the position it occupies in FIGURE 39. Contacts 1 and 2 of this switch are open to maintain a record relay 315 and an auxiliary record relay 316 in their unoperated positions. Contacts 2 and 3 are closed to permit energization of the carriage-return solenoid 174 via the playback advance switch 312 during reproducing. Contacts 4 and 5 are open to disconnect the ground from the first interdigital switch 310 of the advance clutch via a bail safety switch 319 and contacts 8—9 of relay 320.

*Record Condition*

Upon pressing the latch 88 aside and moving the record button 65 to its "on" position the scan lock 105–107 is operated as before described and the machine is placed in record condition. This closes contacts 1 and 2 to supply current from the negative terminal 326 through the record relay 315 and the auxiliary record relay 316 to ground at 317. Contacts 2 and 3 of the record switch are however opened to prevent operation of the carriage-return solenoid 174 when the playback advance switch 312 is operated during a subsequent reset operation. Contacts 4 and 5 of the record switch are closed to cause the dial lock solenoid 251 to be operated to released position via circuit running from ground 317 through a bail safety switch 319 held closed by the latching bail 77 when in operate position—the purpose of the bail safety switch being to prevent record and reproduce operations from getting started until the record and reproduce controls become latched—contacts 9 and 8 of an access relay 320 controlled by access button 314, the first interdigital switch 310 of the advance clutch, contacts 9 and 8 of a motor relay 321 and contacts 16 and 15 of the record relay 315 and the dial lock solenoid to negative terminal 326. Also the closing of contacts 4 and 5 prepares a holding circuit for the motor relay 321 via contacts 9 and 8 of access relay 320, first interdigital switch 310 and contacts 9 and 10 of the motor relay itself.

Contacts 5 and 6 of the auxiliary record relay 316 are now open to remove ground connection from the 400 cycle oscillator erase terminal 322 and to connect this terminal to the head 120 through contacts 1 and 3 of the oscillator dial switch 259 and contacts 9 and 10 of the auxiliary record relay, contacts 8 and 9 of the auxiliary record relay 316 being now open to disconnect the head from the input of the playback amplifier 323. The head 120 is therefore now effective to operate as an eraser. Contacts 6 and 7 of the auxiliary record relay 316 are now closed to connect the clutch solenoid 181 to the plus terminal 317 through contacts 1 and 2 of the clutch switch 189 and the bail safety switch 319. This causes the rocker 150 to be shifted over center to engage the clutch and lower the record head 120 on the record. The bail safety switch serves to permit the clutch to be engaged only when the record switch has become latched in "on" position by the latching bail 77.

Contacts 6 and 7 of the record relay 315 are now closed to start the motor through the jog switch 195. Since the clutch is already engaged and the head lowered on the record the head 120 is driven ahead operating as an eraser until the jog switch is opened by the finger 192 camming off the switch lever 196 as shown in FIGURE 35. The opening of the clutch switch 189 responsive to the initial movement of the carriage from home position does not change the clutch—which is now held engaged by the overcenter biasing of the rocker 150—but serves merely to prevent re-engagement of the clutch, once disengaged, by the carriage-return solenoid 174 until the carriage is returned to home position. The jog switch is set to open when the head has been advanced for a time interval of about 500 milliseconds, which corresponds to about .1" of advance movement of the carriage. During this initial .1" of advance movement of the carriage the mute switch 194 is closed to retain the machine in a muted condition—i.e., a condition unable to operate the dial solenoid 236. The mute switch is necessary only for playback because contacts 14 and 15 of the record relay 315 are open during recording to prevent any accidental operation of the dial solenoid 236. The reason for so preventing any possible operation of the dial solenoid 236, as from transients from the playback amplifier which might operate the dial relay 324, is so that the dog 234 (FIGURES 21, 22 and 33) may not get accidentally displaced from its home position during recording and cause an extra pulse to be produced when the machine is next used for reproducing. Further, the contacts 12 and 13 of the record relay 315 are closed to provide a shunt across the contacts 1 and 2 of the dial relay 324 so that any accidental operation of the dial relay 324 during recording cannot disrupt control of the advance clutch solenoid 280. Contacts 8 and 9 of the record relay 315 are opened to remove the short circuit across the transmitter-receiver circuit TR of the telephone so that the telephone can be used while the machine is operated as a recorder. Contacts 9 and 10 of the record relay 315 are closed to provide a short circuit across the dial pulse switch 237 so that no dialing signal can be fed into the telephone line during recording.

*Record Operation*

When the dial is next wound clockwise to an operate position and released, the motor dial switch 258 is operated within about 10 milliseconds following such release as before described. The opeining of contacts 1 and 3 of the motor dial switch prevents ground terminal 317 from being connected to the advance clutch solenoid 280 via safety switch 319, contacts 5 and 4 of record switch 97, contacts 9 and 8 of access relay 320, interdigital switch 310, contacts 9 and 10 of motor relay 321, contacts 1 and 3 of motor dial switch 258, contacts 11 and 12 of access relay 320, and contacts 1 and 2 of dial relay 324, assuring that the advance clutch will not be operated while the motor dial switch is operated. The closing of contacts 1 and 2 of the motor dial switch 258 activates the motor relay 321 from ground terminal 317 through contacts 2 and 1 of the record switch 97, contacts 2 and 1 of the motor dial switch 258 and through the motor relay 321 to negative terminal 326. Operation of the motor relay starts the motor 144 through the contacts 6 and 7 and causes the carriage to be driven ahead because the clutch is already engaged; however, the recording of a time band does not start until the oscillator dial switch 259 is subsequently operated. As the motor relay 321 is operated it obtains a holding circuit from the ground terminal 317 through the bail safety switch 319, contacts 4 and 5 of the record switch 97, contacts 9 and 8 of the access relay 320, the first interdigital switch 310 of the advance clutch and contacts 9 and 10 of the motor relay. Contacts 8 and 9 of the motor relay are opened to disconnect the dial lock solenoid 251, thereby allowing its locking armature to bear slidably against the bottom face of the motor gear and cause the gear to become again locked when the gear reaches home position. Contacts 12 and 13 of the motor relay 321 are closed but have no effect during recording since the clutch switch 189 in circuit therewith is open while the carriage is out of home position, the switch 12—13 being however necessary during playback as will appear. Contacts 14 and 15 of the motor relay are open but do not remove the shunt across the dial pulse switch 237 since a shunt thereacross is now maintained through contacts 15 and 16 of the motor relay 321 and contacts 9 and 10 of the record relay 315.

About 60 milliseconds after the motor dial switch is operated—which is the time allowed for the motor to reach normal speed—the oscillator dial switch 259 is operated and latched as before described. The opening of contacts 1 and 3 of the oscillator switch disconnects the head 120 from the 400 cycle erase-current source 322, and the closing of contacts 1 and 2 of the oscillator dial switch connects the head to the 200 cycle signal-current source 325, through contacts 9 and 10 of the auxiliary record relay 316, thereby causing the recorder head to start recording a time band on the record.

After an elapse of about 40 milliseconds when digit 1 is dialed, or about 140 milliseconds when digit 2 is dialed, etc., the oscillator dial switch 259 is returned to "off" position to connect the head 120 back to the source of 400 cycle erase current whereby to terminate the time band. About 50 milliseconds before the oscillator dial switch is returned to "off" position, the motor dial switch is returned to "off" position as before explained, but this merely transfers control of the motor from the motor dial switch to the first interdigital switch 310 of the advance clutch. For example, the opening of contacts 1 and 2 of the motor dial switch removes the initial circuit through which the motor relay was operated but the relay stays held by its holding circuit via its contacts 9 and 10 and the first interdigital switch 310. The return of the motor dial switch 258 however activates the advance clutch solenoid 280 from the ground terminal 317 through the bail safety switch 319, contacts 4 and 5 of the record switch 97, contacts 8 and 9 of the access relay 320, the first interdigital switch 310, contacts 9 and 10 of the motor relay 321, contacts 1 and 3 of the motor dial switch 258, contacts 11 and 12 of the access relay 320, contacts 1 and 2 of the dial relay 324, and solenoid 280 to negative terminal 326. The motor relay and the advance clutch solenoid are now both operated through the first interdigital switch 310. The resultant energization of the advance clutch solenoid causes the advance clutch to start running the instant the motor dial switch is returned to "off" position. The advance clutch is set to open the first interdigital switch 310 after 550 milliseconds—which is about 500 milliseconds after the oscillator dial switch is returned to "off" position to terminate the recording of a time band. Operaion of the first interdigital switch 310 drops out both the motor relay and advance clutch solenoid causing the motor to stop and the cam 293 to be returned to zero position with resultant reclosing of the first interdigital switch 310. Thus, 500 milliseconds of erase space is provided on the record after each recorded time band and then the motor is stopped but the carriage is yet held in its advanced position because the clutch is still engaged. The return of the motor relay 321 causes contacts 8 and 9 thereof to make and again actuate the dial lock solenoid 251 to free the dialing mechanism for dialing another digit of a telephone number.

*Access Relay Operation*

Upon pressing the access button 314 after dialing a predetermined digit or digits of a telephone number adapted to make connection to a telephone tie-line, switch 334 is operated closing contacts 1 and 2 and opening contacts 2 and 3 thereof. The closing of contacts 1 and 2 provides an operating circuit for the access relay 320 from ground terminal 317 through the bail safety switch 319, contacts 4 and 5 of the record switch 97, contacts 1 and 2 of the access switch 334, and through the access relay 320 to negative terminal 326. The resultant closing of contacts 6 and 7 of the access relay provides a holding circuit for the relay the instant the access switch is released, this holding circuit being through contacts 2 and 3 of the access switch and the second interdigital switch 311. The opening of contacts 8 and 9 of the access relay as the relay is operated disconnects the first interdigital switch 310 of the advance clutch to remove it from now having any control over the machine. The closing of contacts 9 and 10 of the access relay operates the motor relay 321 and starts the motor, the circuit through which the motor relay is operated being from ground terminal 317 through the bail safety switch 319, contacts 4 and 5 of the record switch 97, contacts 9 and 10 of the access relay and the second interdigital switch 311 and the relay 321 to negative terminal 326. The instant the access relay is operated the advance clutch solenoid 280 is activated through the contacts 4 and 5 of the record switch, contacts 12 and 13 of the access relay and contacts 1 and 2 of the dial relay 324. Thus the advance clutch begins to measure the advance of the recorder head the instant the access switch is closed. During this advance of the head it operates as an eraser to provide the additional unrecorded space on the record. When the head has been advanced for 1450 milliseconds, the cam 293 of the advance clutch opens the second interdigital switch 311 to drop out both the motor relay, which stops the motor, and the access relay 320. The dropping out of the access relay opens at its contacts 12 and 13 the circuit of the advance clutch solenoid 280. The advance clutch solenoid therefore also drops out returning the cam 293 to zero and causing the first and second interdigital switches to return to their initial positions.

If the operator should hold the access switch 334 on for a period longer than the 1450 milliseconds required for the advance clutch to open the second interdigital switch 311, the following occurs: the motor relay 321 is dropped out to stop the motor by the opening of the second interdigital switch 311. The advance clutch is however held on through the contacts 5 and 4 of the record switch, the jumper 13*a* leading to contact 13 of the access relay, contacts 13 and 12 of the access relay and contacts 1 and 2 of the dial relay 324. This leaves the cam 293 standing still in a position to hold the second interdigital switch 311 open. Upon subsequently releasing the access switch 334 the access relay drops out after a short delay caused by the shunt condenser 335 which is connected across this relay, because its holding circuit through its contacts 6 and 7 have been rendered inoperative by the opening of the second interdigital switch 311. The resultant opening of the contacts 12 and 13 of the access relay drops out the advance clutch, causing the cam 293 to return to zero and the first and second interdigital switches to be returned to their initial positions.

If the access switch 334 is released before the 1450 millisecond time interval elapses which is required to operate the second interdigital switch 311, the condenser 335 holds the relay operated long enough for the contacts 2 and 3 to close and retain the access relay 320 operated through its switch contacts 6 and 7 until the second interdigital switch 311 is opened. Thus, regardless of whether the access switch is held operated for a long or short period the motor relay 321 and the advance clutch 280 are kept activated until the second interdigital switch 311 is opened to disconnect power from the motor relay and from the access relay as well as from the advance clutch solenoid 280 through the contacts 12 and 13 of the access relay and contacts 1 and 2 of the dial relay 324.

*Reset Operation*

Upon pressing the reset button 66 after having pressed the record button 65, the reset switch 119 is operated and latched by the bail 77 as before explained. This switch, which is in parallel with the playback switch 83, causes the motor relay 321 to be operated through the bail safety switch 319, and it causes the advance clutch solenoid 280 to be operated through contacts 1 and 2 of dial relay 324, contacts 12 and 11 of access relay 320, contacts 3 and 1 of motor dial switch 258, reset switch 119 and bail safety switch 319. The motor relay and advance clutch solenoid now stay operated until the latching bail 77 is subsequently released. Upon the reset advance switch 313 of the advance clutch being closed, which will occur upon the head having been advanced 2500 milliseconds or more from the time the advance clutch is activated, the carriage return solenoid 174 is activated to shift the bail 169 upwardly to disengage the clutch and return the carriage to home position; moreover, this movement of the bail operating through the link 173 releases the latching bail 77 to restore the record switch 97 and the reset switch 119 to their initial positions and to deactivate the motor relay 321 and advance clutch solenoid 280.

If the reset button is depressed after the first interdigital switch 310 has been operated to provide a 500 millisecond interdigital space on the record following the last recorded time band, there will be provided an additional 2500 millisecond space on the record before the record and reset switches are dropped out and the carriage is returned to home position. If the reset switch is pressed while the record dial is returning from an operate position, the advance of the carriage will continue on, without interruption, after the time band has been recorded but the first interdigital switch 310 is now disabled and the erased space provided on the record after the time band is 2500 milliseconds.

*Playback*

Upon pressing the playback bar 64 to close the playback switch 83 after the machine has been returned to a standby condition, the machine is put into the following condition: the record dial is locked by the dial lock solenoid 251 being now not energized, the record button is latched-locked at 88 in "off" position, the scan lock 105—107 is operated to prevent the record from being shifted by the knob 25, and the playback switch 83 is latched in "on" position by the bail 77. Furthermore, the closing of the playback switch 83 activates directly the motor relay 321 from the negative terminal 326, via the playback switch and the bail safety switch 319. Since the carriage is in home position holding clutch switch 189 closed the solenoid 181 is operated through contacts 13 and 12 of the motor relay to cause the head 120 to be reengaged with the record and the carriage to be clutched to the feed screw. Simultaneously, the motor 144 is started via contacts 6 and 7 of the motor relay 321 to start advancing the head 120 now operating as a reproducer. Also at the first instant, the advance clutch solenoid 280 is activated from terminal 317 via safety switch 319, dial switch 83 contacts 1 and 3 of the motor dial switch 258, contacts 11 and 12 of the access relay 320 and contacts 1 and 2 of the dial relay 324 to negative terminal 326, causing the cam 293 to be advanced with the movement of the head. However, as will appear, only the playback switch 312 of the advance clutch is now active and unless the head encounters an erased space on the record of a duration longer than the timing of the playback switch 312—which is 2250 milliseconds—the advance clutch is dropped out and returned to zero each instant a signal picked up from the record operates the dial relay 324 without having any effect on the operation of the machine.

The operation of the motor relay has the further following effects: the opening of contacts 8 and 9 is now unimportant because the contacts 15 and 16 of the record relay 315 are open, the closing of contacts 9 and 10 is also unimportant because the motor relay is held on by the bail safety switch 319, and the first interdigital switch 310 is disconnected because of the contacts 4 and 5 of the record switch 97 being open. However, the opening of the contacts 14 and 15 of the motor relay serves to remove the short across the dial pulse springs 237 and the closing of the contacts 15 and 16 of the motor relay serves to mute the transmitter T and receiver R of the telephone.

When, during playback, the head runs into a time band representing a recorded digit of a telephone number, the dial relay 324 is activated by the signals picked up from the record and closes its contacts 1 and 3. This activates the dial solenoid 236 from the ground terminal 317 through the bail safety switch 319, the playback switch 83, the motor dial switch 258, contacts 11 and 12 of the access relay 320, contacts 1 and 3 of the dial relay 324, the mute switch 194 now closed, the dial solenoid 236 and contacts 14 and 15 of the record relay 315 to negative terminal 326. Operation of the dial solenoid removes the stop finger 236*a* from the dog 324, causing the clutch spring 235 to lockup and start driving instantly the cam 232 at the fixed speed of one revolution per 100 milliseconds at which the shaft 229 is driven by the motor. Any momentary release of the dog will cause the cam to be driven for one full revolution, causing the pulsing switch to be held open for 60 milliseconds and closed for 40 milliseconds to provide one dialing pulse. Thus, the initial time band on the record to produce one dial pulse need not be 100 milliseconds in duration. A suitable time duration for releasing the stop finger 236*a* from the dog and for allowing the stop finger to get back into a blocking position before completion of one revolution of the cam is 40 milliseconds. Thus, there is recorded a 40 millisecond time band on the record when the digit "1" is dialed, as before described. However, there is recorded an additional time element of 100 milliseconds for each additional digit. Thus, a first 40 millisecond time band will feed out one pulse, a 140 millisecond time band will feed out two pulses, etc.

The movement of the head carriage through no signal bands such as the initial mute zone of 500 milliseconds, the regular interdigital spaces of 500 milliseconds, and the greater interdigital space of 2000 milliseconds which is provided when the access switch is closed, will in each instance start the advance clutch running but since these time periods are less than the timing period of 2250 milliseconds of the playback advance switch 312 the head will encounter a signal at the end of each of these erased spaces on the record before the advance clutch operates the playback advance switch 312, causing the advance clutch to drop out and the cam 293 to return back to zero. However, when the head runs into the reset time band of 2500 milliseconds, the playback advance switch 312 will be operated to activate the carriage return solenoid 174 through the contacts 2 and 3 of the record switch 97, whereby to return the machine to standby condition. That is, as before explained under "Reset Operation," the carriage is lifted from the record, the carriage is unclutched and returned to home position, and the latching bail 77 is released to restore in this case the playback switch 83 to its initial position.

The end switch 179 is provided for safety purposes to return the carriage to home position, without operating through the playback and reset advance switch circuits when the track is so completely filled with time bands that the head during playback is advanced through the full length of the track.

The embodiment of our invention herein particularly shown and described is intended to be illustrative and not limitative of our invention since the same is subject to changes and modifications without departure from the scope of our invention, which we endeavor to cover by the following claims.

We claim:

1. In a machine for recording telephone numbers in code form: the combination of a dialing mechanism selectively operable according to selected letters and digits of telephone numbers; a signal source; a recorder for recording signals from said source on a record medium; means actuated by release of said dialing mechanism from an operated position for first starting said recorder and thereupon feeding a signal thereto from said source; and means controlled by said dialing mechanism for terminating the feed of signals from said source to said recorder whereby to cause a continuous signal band to be recorded on said record medium of a duration dependent upon the letter or digit dialed.

2. The combination set forth in claim 1, including means for converting said recorder to an eraser the instant the feed of signal to the recorder is terminated; and means responsive to each selective operation of said dialing mechanism for causing said recorder to operate as an eraser for a predetermined interval in conjunction with each recording of a signal band whereby to provide an erased space on the record medium between each recorded signal band and the next.

3. The combination set forth in claim 1, wherein said dialing mechanism is of a rotary type including a motor driven at a constant speed; and means for coupling said dialing mechanism to said motor and returning said dial at a fixed speed determined by said motor upon release of the dial from an operated position.

4. The combination set forth in claim 1 wherein said dialing mechanism is of a rotary type including a motor driven at a constant speed; a one-way clutch between said dialing mechanism and motor allowing return of the dial up to a pre-determined speed determined by said motor; and spring means tending to return said dial at a faster speed for causing said clutch to be held engaged during return of the dial from an operated position.

5. In a machine for recording telephone numbers in code form: the combination of a dialing mechanism including a dial selectively operable according to digits to be dialed and adapted to return at a fixed speed when released from an operated position; a signal source; a recorder for recording signals from said source on a record medium; means controlled by said dialing mechanism for starting and stopping said recorder respectively as the dial is released from an operated position and as it is returned to home position; and further means controlled by said dialing mechanism for connecting said recorder to said signal source after the recorder is started and for disconnecting the recorder from said signal source before the recorder is stopped, including timing means for causing the time period during which the recorder is connected to said signal source when the digit "1" is dialed to be substantially less than the time interval required for said dial to return through the space distance between successive digits, and to cause said time period to be increased by said time interval for each higher digit dialed.

6. A dialing mechanism for a telephone-number recording machine including a rotatable dial having finger holes and an associated index for dialing selected letters and digits; spring means connected to said dial and tending to return the dial at an above-normal speed upon release of the dial from an operated position; and means for restraining said spring means to maintain the return of said dial at a normal speed, comprising a motor, cooperable coupling elements connected respectively to said motor and dial and effective when interconnected to allow said dial to return at a normal speed determined by said motor acting as a brake on said spring means; and one-way clutch means responsive to the overdriving force of said spring means on said dial while the dial is in a released condition for interconnecting said coupling elements.

7. A telephone dialing mechanism for establishing a timed control operation in predetermined relation to the letter or digit dialed, comprising a pivoted dial having finger holes at equiangular space intervals about the center of the dial; spring loaded wind-up means operable by said dial; a drive shaft coupled to said wind-up means; a synchronous motor having a drive shaft; one-way clutch means between said shafts in disengaged condition when said motor shaft is turning at the greater speed and engaged when said wind-up means tends to return its drive shaft at a greater speed in the direction of said motor shaft, said spring loaded wind-up means tending upon release thereof from an operated position to be driven at the greater speed for engaging said clutch and retarding the return speed of said dial to a uniform speed determined by said motor as the dial is returned to home position.

8. In a machine for recording and reproducing coded telephone numbers: the combination of a dialing mechanism; means for recording continuous signal bands on a record medium of respective durations according to the digits dialed on said dialing mechanisms; means for successively reproducing said recorded signal bands and means responsive to the reproduction of each signal band from the record medium for converting each signal band into an integral number of dialing pulses according to the respective digit dialed when said signal band was recorded.

9. In a machine for recording telephone numbers in code form and for reproducing said recorded numbers in terms of dialing pulses: the combination of a dialing mechanism; means for recording on a record medium successive signal bands of respective durations in predetermined relation to the successive letters and digits of telephone numbers dialed on said dialing mechanism; means for reproducing the signal bands of a telephone number in sequence; and means responsive to the respective signal bands reproduced from the record medium for producing a dialing pulse or dialing pulses according to the digit or letter corresponding to each signal band.

10. In a machine for recording telephone numbers in code form and for reproducing said recorded numbers in terms of dialing pulses; the combination of a dialing mechanism; means responsive to each dialing of a letter or digit on said mechanism for recording on a record medium a continuous signal band of a duration depending on the letter or digit dialed; means for providing unrecorded interdigital spaces on the record medium between successive signal bands; means for playing back said successive signal bands in sequence at a fixed rate of speed; and pulsing means controlled by said signal bands reproduced from the record medium for producing respective dialing pulses each of a number dependent upon the letter or digit dialed when the respective band was recorded.

11. A telephone calling machine for feeding dialing pulses into a telephone line to make connections with selected subscribers' telephones, comprising a record medium having recorded thereon spaced signal bands of respective time durations in predetermined relation to respective letters and digits of telephone numbers; a constant speed motor; switch means for producing dialing pulses; a rotatable cam for operating said switch means; and means for driving said cam by said motor including a one-revolution clutch having a control element releasable to instantly engage the clutch and returnable to cause the clutch to be subsequently disengaged when said cam completes the revolution of movement which it is undergoing when said control element is returned, and means responsive to the signals reproduced from the record medium for holding said control element released substantially for the duration of reproduction of each signal band.

12. A telephone calling machine for feeding dialing pulses into a telephone line to make connections with selected subscribers' telephones, comprising a record medium having recorded thereon spaced signal bands of respective time durations in predetermined relation to respective letters and digits of telephone numbers; a constant speed motor; switch means for producing dialing pulses; a rotatable cam for operating said switch means; and means for driving said cam by said motor comprising a shaft driven by said motor; means freely rotatably mounting said cam on said shaft; a dog freely rotatably mounted on said shaft in spaced relation to said cam; a coil spring on said shaft connected at its ends to said cam and dog respectively, said spring tending to bind itself by its natural resilience on said shaft and being coiled in a direction such that when said dog is held from turning the frictional forces of said shaft on said spring tend to unwind the spring and release it from the shaft and the instant said dog is released the resisting forces on said cam tend to bind the spring onto said shaft and cause the cam to be driven with the shaft; stop means normally positioned to hold said dog from turning; and means operable by signals reproduced from said record medium for holding said stop means released for the durations of said respective signal bands when a recorded telephone number is reproduced.

13. A telephone calling machine for feeding dialing pulses into a telephone line to make connections with selected subscribers' telephones, comprising a record medium having recorded thereon separate signal bands of respective time durations in predetermined relation to respective letters and digits of telephone numbers; means for playing back said recorded signal bands in sequence; a motor; a dial pulsing switch; a cam for operating said switch; a one-revolution clutch for coupling said motor to said cam; and means controlled by the signals reproduced from the record for activating said clutch at the beginning of each signal band and for deactivating said clutch and stopping said cam at its starting point of rotation when playback of a signal band ends.

14. In a machine for recording telephone numbers in code form; the combination of a dialing mechanism; a support for a record medium; a record-erase head; means mounting said record support and said head for relative advance and backspace movements to each other; means for normally holding said head in a home position relative to said record medium; a manually operable record-control means for placing said machine into record condition; means responsive to operation of said record-control means into "on" position when said head is in home position for causing said head to be moved relative to said record medium through a predetermined distance from home position; and means responsive to each dialing of a letter or digit on said dialing mechanism for producing a relative advance movement between said head and record medium starting from said predetermined distance from home position.

15. The combination set forth in claim 14, including a source of erase current; and means responsive to operation of said record-control means into "on" position for connecting said source of erase current to said head to cause said head to operate as an eraser during the initial relative advance movement of said head through said predetermined distance from home position.

16. The combination set forth in claim 14, including sources of erase and signal current; means responsive to operation of said record-control means to "on" position for connecting said head to said source of erase current; and means controlled by said dialing mechanism after said head has been advanced by said predetermined distance from home position relative to the record, for shifting the connection of said head from said erase source to said signal source.

17. The combination set forth in claim 14, wherein said head is operable also as a reproducer, including a manually operable reproduce-control means for placing said machine into reproduce condition; means for producing dialing pulses responsive to operation of said machine as a reproducer on a prerecorded record; means responsive to operation of said reproduce-control means to "on" position for starting a progressive advance movement of said head from home position relative to the record; and means controlled by the relative advance movement between said head and record medium for disabling the machine as a reproducer until the head has been advanced through said predetermined distance from home position.

18. In a machine for recording telephone numbers in code form; the combination of a dialing mechanism including a dial selectively operable according to digits to be dialed and spring means tending to return the dial at an above-normal speed when the dial is released from an operated position; a signal source; a recorder for recording signals from said source; a constant speed motor; a one-way transmission including a lost-motion coupling between said dial and said motor permitting windup of the dial but causing return of the dial to be restrained by the motor through said one-way transmission after take-up of said lost-motion coupling; and means for starting said motor by the return movement of said dial during take-up of said lost-motion coupling.

19. The recording machine set forth in claim 18 including a switch for coupling said signal source to said recorder, and means actuated by said dial during an initial return movement thereof following the take-up of said lost-motion coupling for operating said switch.

References Cited in the file of this patent

UNITED STATES PATENTS

| | | |
|---|---|---|
| 2,222,131 | Willis | Nov. 19, 1940 |
| 2,276,954 | Fritts | Mar. 17, 1942 |
| 2,567,812 | Hickman | Sept. 11, 1951 |
| 2,892,897 | Vidal | June 30, 1959 |
| 2,921,142 | Tinus | Jan. 12, 1960 |
| 2,941,043 | Ham | June 14, 1960 |